US012371219B2

(12) United States Patent
Sollie et al.

(10) Patent No.: US 12,371,219 B2
(45) Date of Patent: Jul. 29, 2025

(54) INSULATED BOX ASSEMBLY WITH OVERLAPPING PANELS

(71) Applicant: Pratt Retail Specialties, LLC, Brookhaven, GA (US)

(72) Inventors: Greg Sollie, Sharpsburg, GA (US); Jamie Waltermire, Peachtree City, GA (US); Shifeng Chen, Newport News, VA (US)

(73) Assignee: Pratt Retail Specialties, LLC, Brookhaven, GA (US)

( * ) Notice: Subject to any disclaimer, the term of this patent is extended or adjusted under 35 U.S.C. 154(b) by 0 days.

(21) Appl. No.: 19/056,551

(22) Filed: Feb. 18, 2025

(65) Prior Publication Data

US 2025/0187782 A1 Jun. 12, 2025

Related U.S. Application Data

(63) Continuation of application No. 18/140,641, filed on Apr. 28, 2023, now Pat. No. 12,297,016, which is a (Continued)

(51) Int. Cl.
*B65D 5/22* (2006.01)
*B31B 50/26* (2017.01)

(Continued)

(52) U.S. Cl.
CPC .............. *B65D 5/22* (2013.01); *B31B 50/262* (2017.08); *B65D 5/2057* (2013.01); *B65D 5/64* (2013.01);

(Continued)

(58) Field of Classification Search
CPC .......... B65D 5/22; B65D 5/2057; B65D 5/64; B65D 81/3858; B65D 81/3862;

(Continued)

(56) References Cited

U.S. PATENT DOCUMENTS 4,613,627 A 9/1986 Sherman et al.
8,651,593 B2 * 2/2014 Bezich ..................... B65D 5/68 312/259

(Continued)

FOREIGN PATENT DOCUMENTS

AU 2018260901 B2 1/2025
AU 2024216411 B2 1/2025
AU 2023266362 B2 2/2025

OTHER PUBLICATIONS

Anagnostopoulos, John; Non-Final Office Action for U.S. Appl. No. 19/056,573, filed Feb. 18, 2025, mailed Apr. 30, 2025, 13 pgs.

(Continued)

*Primary Examiner* — Christopher R Demeree
(74) *Attorney, Agent, or Firm* — Taylor Duma LLP

(57) ABSTRACT

A box assembly can include an exterior piece including a first middle portion, a second middle portion, a third middle portion, and a fourth middle portion; the first middle portion and the third middle portion positioned perpendicular to the second middle portion and the fourth middle portion; a plurality of insulator pads including a first side insulator pad, a second side insulator pad, and a third side insulator pad; the first side insulator pad contacting the first middle portion; the second side insulator pad contacting the first middle portion, the second middle portion, and the third middle portion; the third side insulator pad contacting the third middle portion; and an interior piece positioned within the exterior piece, the interior piece including a first side panel and a second side panel; the first side insulator pad positioned between the first side panel and the first middle portion.

9 Claims, 25 Drawing Sheets

Related U.S. Application Data continuation of application No. 17/492,285, filed on Oct. 1, 2021, now Pat. No. 11,724,851, which is a continuation of application No. 16/879,811, filed on May 21, 2020, now Pat. No. 11,203,458, which is a continuation of application No. 16/382,710, filed on Apr. 12, 2019, now Pat. No. 10,858,141.

(60) Provisional application No. 62/760,672, filed on Nov. 13, 2018.

(51) Int. Cl.

| | |
|---|---|
| ***B65D 5/20*** | (2006.01) |
| ***B65D 5/64*** | (2006.01) |
| ***B65D 25/02*** | (2006.01) |
| ***B65D 81/38*** | (2006.01) |
| *B31B 110/35* | (2017.01) |

(52) U.S. Cl.

CPC ......... *B65D 25/02* (2013.01); *B65D 81/3858* (2013.01); *B65D 81/386* (2013.01); *B31B 2110/35* (2017.08)

(58) Field of Classification Search

CPC B65D 81/3823; B65D 81/3813; B65D 5/566; B65D 77/042; B65D 1/22; B65D 21/00; B65D 5/56; B65D 81/38; B65D 81/3825; F25D 2331/804; F25D 2323/061; B32B 2307/304

USPC ..... 229/103.11, 122.32, 122.34; 220/592.25, 220/592.2, 592.26, 4.29, 592.23; 206/594, 545; 312/259; 62/60

See application file for complete search history.

(56) References Cited

U.S. PATENT DOCUMENTS

| | | | | |
|---|---|---|---|---|
| 9,272,475 | B2 * | 3/2016 | Ranade | B65D 81/3823 |
| 11,499,770 | B2 * | 11/2022 | Rizzo | B65D 81/3834 |
| 12,270,153 | B2 | 4/2025 | Anagnostopoulos et al. | |
| 12,286,285 | B2 | 4/2025 | Waltermire et al. | |
| 12,286,286 | B2 | 4/2025 | Sollie et al. | |
| 12,297,016 | B2 | 5/2025 | Sollie et al. | |
| 12,298,060 | B2 | 5/2025 | Waltermire et al. | |
| 12,305,911 | B2 | 5/2025 | Waltermire et al. | |
| 2003/0199218 | A1 | 10/2003 | Mueller et al. | |
| 2004/0119202 | A1 | 6/2004 | Helber et al. | |
| 2004/0140243 | A1 | 7/2004 | Roesel et al. | |
| 2008/0156581 | A1 | 7/2008 | Englert et al. | |
| 2014/0021208 | A1 * | 1/2014 | Anti | A01N 1/148 220/592.25 |
| 2018/0178965 | A1 | 6/2018 | Tsai et al. | |
| 2023/0257157 | A1 | 8/2023 | Sollie et al. | |
| 2025/0188679 | A1 | 6/2025 | Anagnostopoulos et al. | |

OTHER PUBLICATIONS

Sollie, Greg; Certificate of Correction for U.S. Appl. No. 18/106,169, filed Feb. 6, 2023, mailed Apr. 29, 2025, 1 pg.
Waltermire, Jamie; Non-Final Office Action for U.S. Appl. No. 17/127,060, filed Dec. 18, 2020, mailed Apr. 25, 2025, 23 pgs.
Waltermire, Jamie; Non-Final Office Action for U.S. Appl. No. 17/173,293, filed Feb. 11, 2021, mailed Apr. 11, 2025, 16 pgs.
Waltermire, Jamie; Non-Final Office Action for U.S. Appl. No. 18/115,791, filed Mar. 1, 2023, mailed Apr. 9, 2025, 22 pgs.
Sollie, Greg; Applicant-Initiated Interview Summary for U.S. Appl. No. 17/536,878, filed Nov. 29, 2021, mailed Apr. 2, 2025, 2 pgs.
Collison, Alan B.; Notice of Allowance for U.S. Appl. No. 18/234,425, filed Aug. 16, 2023, mailed Apr. 2, 2025, 35 pgs.
Sollie, Greg; Notice of Allowance for U.S. Appl. No. 18/140,641, filed Apr. 28, 2023, mailed Mar. 26, 2025, 13 pgs.
Sollie, Greg; Notice of Allowance for U.S. Appl. No. 18/140,641, filed Apr. 28, 2023, mailed Oct. 31, 2024, 22 pgs.
Sollie, Greg; Final Office Action for U.S. Appl. No. 18/140,641, filed Apr. 28, 2023, mailed Jun. 27, 2024, 19 pgs.
Sollie, Greg; Non-Final Office Action for U.S. Appl. No. 18/140,641, filed Apr. 28, 2023, mailed Dec. 27, 2023, 147 pgs.
Sollie, Greg; Requirement for Restriction/Election for U.S. Appl. No. 18/140,641, filed Apr. 28, 2023, mailed Nov. 8, 2023, 5 pgs.
Waltermire, Jamie; Final Office Action for U.S. Appl. No. 18/734,865, filed Jun. 5, 2024, mailed May 23, 2025, 45 pgs.
Collison, Alan B.; Non-Final Office Action for U.S. Appl. No. 18/612,835, filed Mar. 21, 2024, mailed Jun. 6, 2025, 21 pgs.
Waltermire, Jamie; Final Office Action for U.S. Appl. No. 17/127,060, filed Dec. 18, 2020, mailed Jun. 17, 2025, 14 pgs.
Waltermire, Jamie; Final Office Action for U.S. Appl. No. 18/385,726, filed Oct. 31, 2023, mailed May 12, 2025, 18 pgs.
Waltermire, Jamie; Final Office Action for U.S. Appl. No. 17/538,795, filed Nov. 30, 2021, mailed Jun. 5, 2025, 34 pgs.
Waltermire, Jamie; Non-Final Office Action for U.S. Appl. No. 19/188,779, filed Apr. 24, 2025, mailed Jun. 3, 2025, 11 pgs.
Sollie, Greg; Notice of Allowance for U.S. Appl. No. 17/536,878, filed Nov. 29, 2021, mailed May 7, 2025, 12 pgs.
Sollie, Greg; Final Office Action for U.S. Appl. No. 18/974,426, filed Dec. 9, 2024, mailed Jun. 13, 2025, 24 pgs.
Sollie, Greg; Non-Final Office Action for U.S. Appl. No. 19/185,469, filed Apr. 22, 2025, mailed May 30, 2025, 9 pgs.
Sollie, Greg; Examination Report for Australian Patent Application No. 2024204391, filed Nov. 14, 2018, mailed May 30, 2025, 3 pgs.

* cited by examiner

INSULATED BOX ASSEMBLY WITH OVERLAPPING PANELS

CROSS-REFERENCE TO RELATED APPLICATIONS

This application is a continuation of U.S. patent application Ser. No. 18/140,641, filed Apr. 28, 2023, which is a continuation of U.S. patent application Ser. No. 17/492,285, filed Oct. 1, 2021, which issued as U.S. Pat. No. 11,724,841 on Aug. 15, 2023, which is a continuation of U.S. patent application Ser. No. 16/879,811, filed May 21, 2020, which issued as U.S. Pat. No. 11,203,458 on Dec. 21, 2021, which is a continuation of U.S. patent application Ser. No. 16/382,710, filed Apr. 12, 2019, which issued into U.S. Pat. No. 10,858,141 on Dec. 8, 2020, which claims the benefit of U.S. Provisional Application No. 62/760,672, filed on Nov. 13, 2018, which are each hereby incorporated by reference herein in their entireties.

JOINT RESEARCH AGREEMENT

The subject matter disclosed was developed and the claimed invention was made by, or on behalf of, one or more parties to a joint research agreement between MP Global Products LLC of Norfolk, NE and Pratt Retail Specialties, LLC of Conyers, GA, that was in effect on or before the effective filing date of the claimed invention, and the claimed invention was made as a result of activities undertaken within the scope of the joint research agreement.

TECHNICAL FIELD

This disclosure relates to foldable boxes. More specifically, this disclosure relates to insulated foldable boxes.

BACKGROUND

Home delivery of food is becoming more common as the process becomes more efficient and costs go down. Delivery boxes may alternatively need to keep the food hot or cold enough to, for example, prevent bacterial growth, prevent melting or congealing of the food, or simply maintain the edibility, texture, and flavor of the food. Another consideration for the type of box to use is its impact on the environment, as it relates to the reusability and recyclability of the boxes. Polystyrene foam boxes are prevalent in the food-delivery industry because of their low cost, but they are not commonly recycled. Thus, they take up a disproportionate volume of landfill space.

SUMMARY

It is to be understood that this summary is not an extensive overview of the disclosure. This summary is exemplary and not restrictive, and it is intended neither to identify key or critical elements of the disclosure nor delineate the scope thereof. The sole purpose of this summary is to explain and exemplify certain concepts off the disclosure as an introduction to the following complete and extensive detailed description.

Disclosed is a box assembly comprising an exterior piece comprising a first middle portion, a second middle portion, a third middle portion, and a fourth middle portion; the first middle portion and the third middle portion positioned perpendicular to the second middle portion and the fourth middle portion; a plurality of insulator pads comprising a first side insulator pad, a second side insulator pad, and a third side insulator pad; the first side insulator pad contacting the first middle portion; the second side insulator pad contacting the first middle portion, the second middle portion, and the third middle portion; the third side insulator pad contacting the third middle portion; and an interior piece positioned within the exterior piece, the interior piece comprising a first side panel and a second side panel; the first side insulator pad positioned between the first side panel and the first middle portion; the second side panel extending between the second side insulator pad and each of the first side insulator pad and the third side insulator pad.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures may be designated by matching reference characters for the sake of consistency and clarity.

DETAILED DESCRIPTION

Figure 1:
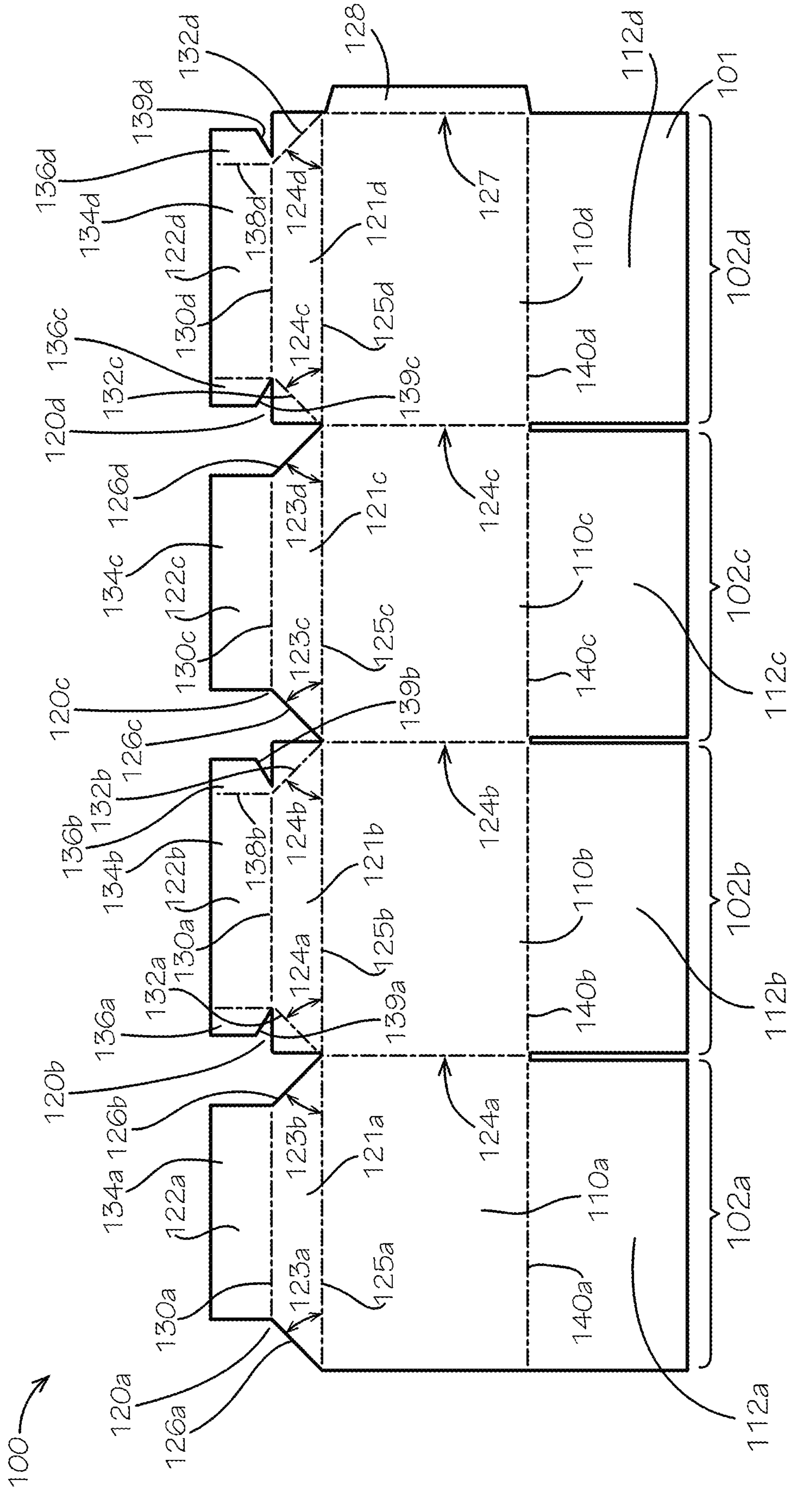
FIG. 1 shows a blank configured to be assembled into an exterior piece of an insulated box in accordance with one aspect of the present disclosure.

The present disclosure can be understood more readily by reference to the following detailed description, examples, drawings, and claims, and the previous and following description. However, before the present devices, systems, and/or methods are disclosed and described, it is to be understood that this disclosure is not limited to the specific devices, systems, and/or methods disclosed unless otherwise specified, and, as such, can, of course, vary. It is also to be understood that the terminology used herein is for the purpose of describing particular aspects only and is not intended to be limiting.

The following description is provided as an enabling teaching of the present devices, systems, and/or methods in its best, currently known aspect. To this end, those skilled in the relevant art will recognize and appreciate that many changes can be made to the various aspects of the present devices, systems, and/or methods described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms “a,” “an” and “the” include plural referents unless the context clearly dictates otherwise. Thus, for example, reference to “an element” can include two or more such elements unless the context indicates otherwise.

Ranges can be expressed herein as from “about” one particular value, and/or to “about” another particular value. When such a range is expressed, another aspect includes from the one particular value and/or to the other particular value. Similarly, when values are expressed as approximations, by use of the antecedent “about,” it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms “optional” or “optionally” mean that the subsequently described event or circumstance can or cannot occur, and that the description includes instances where said event or circumstance occurs and instances where it does not.

The word “or” as used herein means any one member of a particular list and also includes any combination of members of that list. Further, one should note that conditional language, such as, among others, “can,” “could,” “might,” or “may,” unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific aspect or combination of aspects of the disclosed methods.

FIG. 1 shows in one exemplary aspect an exterior piece 100 of an insulated box 2400 (shown in FIG. 25) in an unassembled configuration as a blank. As shown, the exterior piece 100 can comprise four subpanels 102*a,b,c,d*. Each subpanel can comprise a middle portion 110*a,b,c,d*, an upper portion 120*a,b,c,d*, and a lower portion 112*a,b,c,d*. The middle portions 110*a,b,c,d* can be joined by fold lines 124*a,b,c*. A side strip 128 can be joined to the fourth middle portion 110*d* by a fold line 127. The exterior piece 100 as a blank can define a planar first exterior surface 101, with a similar planar second exterior surface (not shown) opposite from the exterior surface 101.

Each middle portion 110*a,b,c,d* can be joined to an upper portion 120*a,b,c,d* by a fold line 125*a,b,c,d*. Each upper portion can comprise a connecting segment 121*a,b,c,d* and an end segment 122*a,b,c,d*. The end segments 122*a,b,c,d* can be joined to the connecting segments 121*a,b,c,d* by fold lines 130*a,b,c,d*.

The connecting segments 121*a,c* can be of various shapes, including rectangles, parallelograms, and trapezoids. In the current aspect, a first connecting segment 121*a* and a third connecting segment 121*c* can be trapezoidal in shape. The legs 126*a,b,c,d* of the first and third connecting segments 121*a,c* can form angles 123*a,b,c,d* with the fold lines 125*a,b,c,d*. The angles 123*a,b,c,d* can be about 45 degrees. A second and a fourth connecting segment 121*b,d* can be substantially rectangular and can comprise or define crease lines 132*a,b,c,d*.

Each end segment 122*a,b,c,d* can comprise a middle tab 134*a,b,c,d* and a side tab 136*a,b,c,d*. In the current aspect, the second and fourth end segments 122*b,d* can each comprise two side tabs 136*a,b,c,d*. The side tabs 136*a,b,c,d* can be joined to the middle tabs 134*a,b,c,d* by fold lines 138*a, b,c,d*. Each side tab can comprise a bottom edge 139*a,b,c,d*, and each bottom edge 139*a,b,c,d* can form an angle with the fold lines 138*a,b,c,d*. The lower portions 112*a,b,c,d* can be joined to the middle portions 110*a,b,c,d* by fold lines 140*a, b,c,d*.

Figure 2:
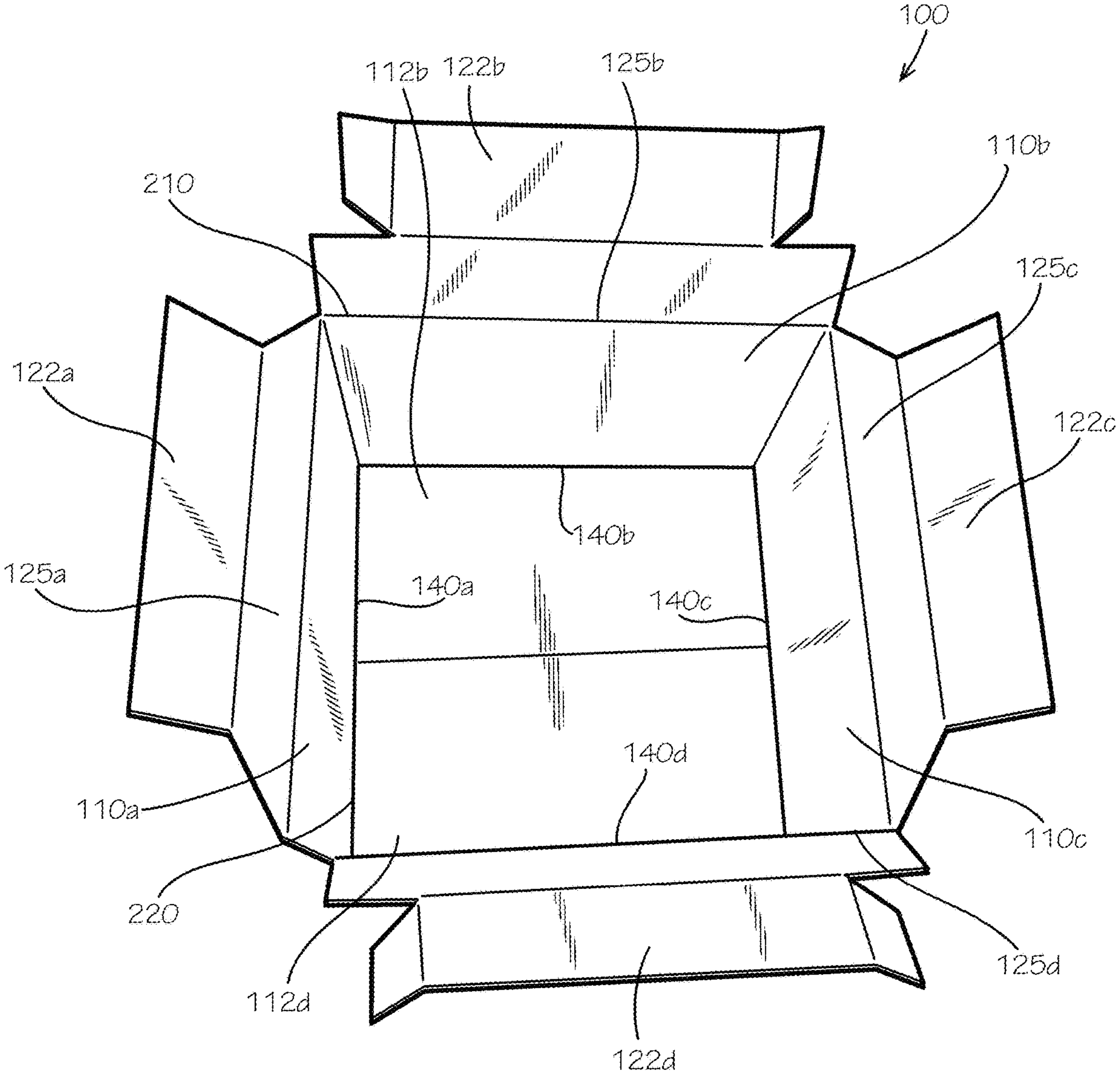
FIG. 2 is a perspective view of the exterior piece of the insulated box assembled from the blank of FIG. 1.

FIG. 2 is a perspective view of the exterior piece 100 in an assembled configuration. The fold lines 140*a,b,c,d* joining the middle portions 110*a,b,c,d* to the upper portions 120*a,b,c,d* can form a top outside edge 210. The fold lines 140*a,b,c,d* joining the middle portions 110*a,b,c,d* to the lower portions 112*a,b,c,d* can form a bottom outside edge 220. The side strip 128 can be affixed to the first subpanel 102*a* by staples, hot melt glue, or other adhesives known in the art, or with no adhesive at all.

Figure 3:
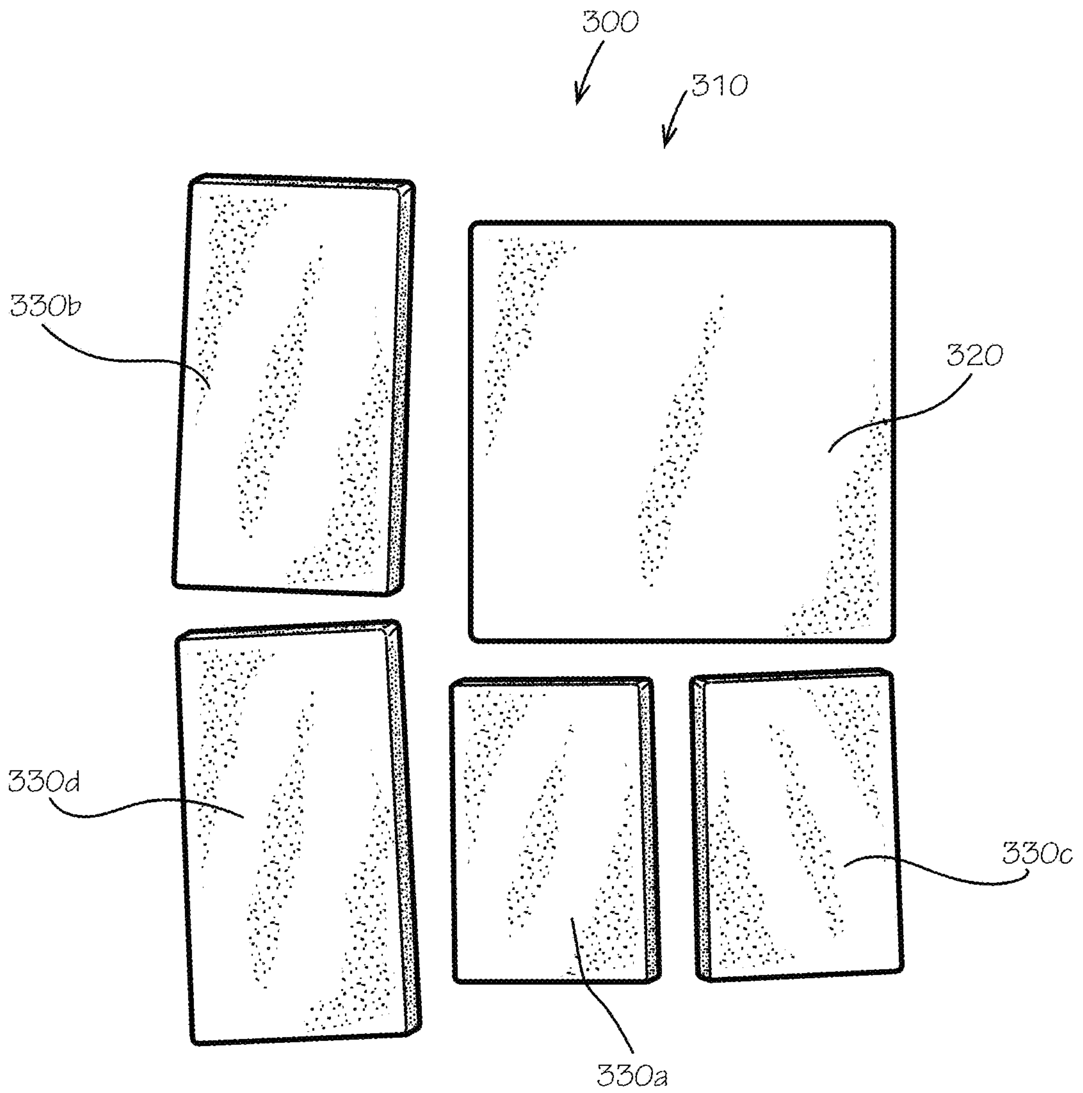
FIG. 3 shows a side view of insulator pads configured to be placed between an interior piece of the insulated box and the exterior piece, according to another aspect of the present disclosure.

FIG. 3 shows an exemplary aspect of an insulator 300 that can be used in the insulated box 2400. The insulator 300 can form a loose fill (not shown) or another configuration known in the art. In the current aspect, the insulator 300 can comprise insulator pads 310. The insulator pads 310 can comprise a variety of materials known in the art, such as polystyrene and/or cellulose. The insulator pads 310 can comprise a bottom insulator 320 and side insulators 330*a, b,c,d*. The side insulators 330*a,b,c,d* can comprise a first, second, third, and fourth side insulator 330*a,b,c,d*, respectively. The first and third side insulators 330*a,c* can be shorter than the second and fourth side insulators 330*b,d*. The side insulators can also comprise a single insulator pad (not shown) extending circumferentially around an interior piece 500.

The insulator pads 310 can comprise paper or other paper fiber materials; however, in other aspects, the insulation batts can comprise cotton, foam, rubber, plastics, fiberglass, mineral wool, or any other flexible insulation material. In the present application, the insulation batts can be repulpable. In the present aspect, the insulated box 2400 can be 100% recyclable. In the present aspect, the insulated box 2400 can be single-stream recyclable wherein all materials comprised by the insulated box 2400 can be recycled by a single processing train without requiring separation of any materials or components of the insulated box 2400. In the present aspect, the insulated box 2400 can be compostable. In the present aspect, the insulated box 2400 can be repulpable. In the present aspect, the insulated box 2400 and the insulator pads 310 can be repulpable in accordance with the requirements of the Aug. 16, 2013, revision of the "Voluntary Standard For Repulping and Recycling Corrugated Fiberboard Treated to Improve Its Performance in the Presence of Water and Water Vapor" provided by the Fibre Box Association of Elk Grove Village, IL which is hereby incorporated in its entirety. In the present aspect, the insulated box 2400 and the insulator pads 310 can be recyclable in accordance with the requirements of the Aug. 16, 2013, revision of the "Voluntary Standard For Repulping and Recycling Corrugated Fiberboard Treated to Improve Its Performance in the Presence of Water and Water Vapor" provided by the Fibre Box Association of Elk Grove Village, IL.

Recyclable and repulpable insulation materials are further described in U.S. patent application Ser. No. 15/677,738, filed Aug. 15, 2017, U.S. Provisional Patent Application No. 62/375,555, filed Aug. 16, 2016, U.S. Provisional Patent Application No. 62/419,894, filed Nov. 9, 2016, and U.S. Provisional Patent Application No. 62/437,365, filed Dec. 21, 2016, which are each incorporated by reference in their entirety herein.

Figure 4:
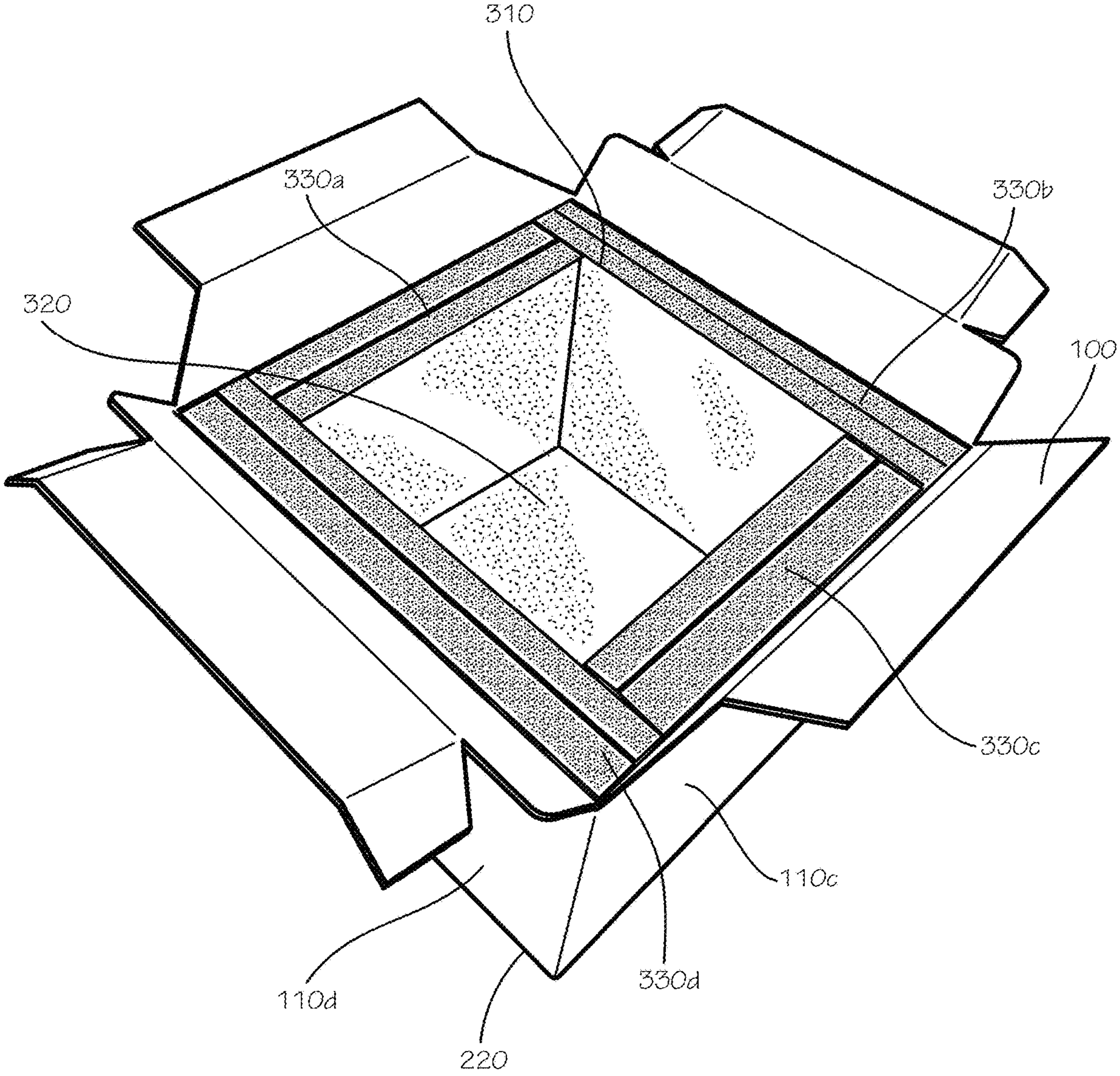
FIG. 4 is a perspective view of the insulator pads placed inside the exterior piece.

FIG. 4 is a perspective view of the partially assembled insulated box 2400. The insulator pads 310 are placed inside the assembled exterior piece 100. The bottom insulator 320 can cover, or proximately face, the lower portions 112*a,b,c,d* (not shown) of the exterior piece 100. The bottom insulator 320 can fully extend to the bottom outside edge 220. The side insulators 330*a,b,c,d* can alternate shorter and longer. For example, in the current aspect, the first side insulator 330*a* can be configured to proximately face the first middle portion 110*a* (not shown). Likewise, the second, third, and fourth side insulators 330*bc,d*, respectively, can be configured to face the corresponding numbered middle portions 110*b,c,d*.

Figure 5:
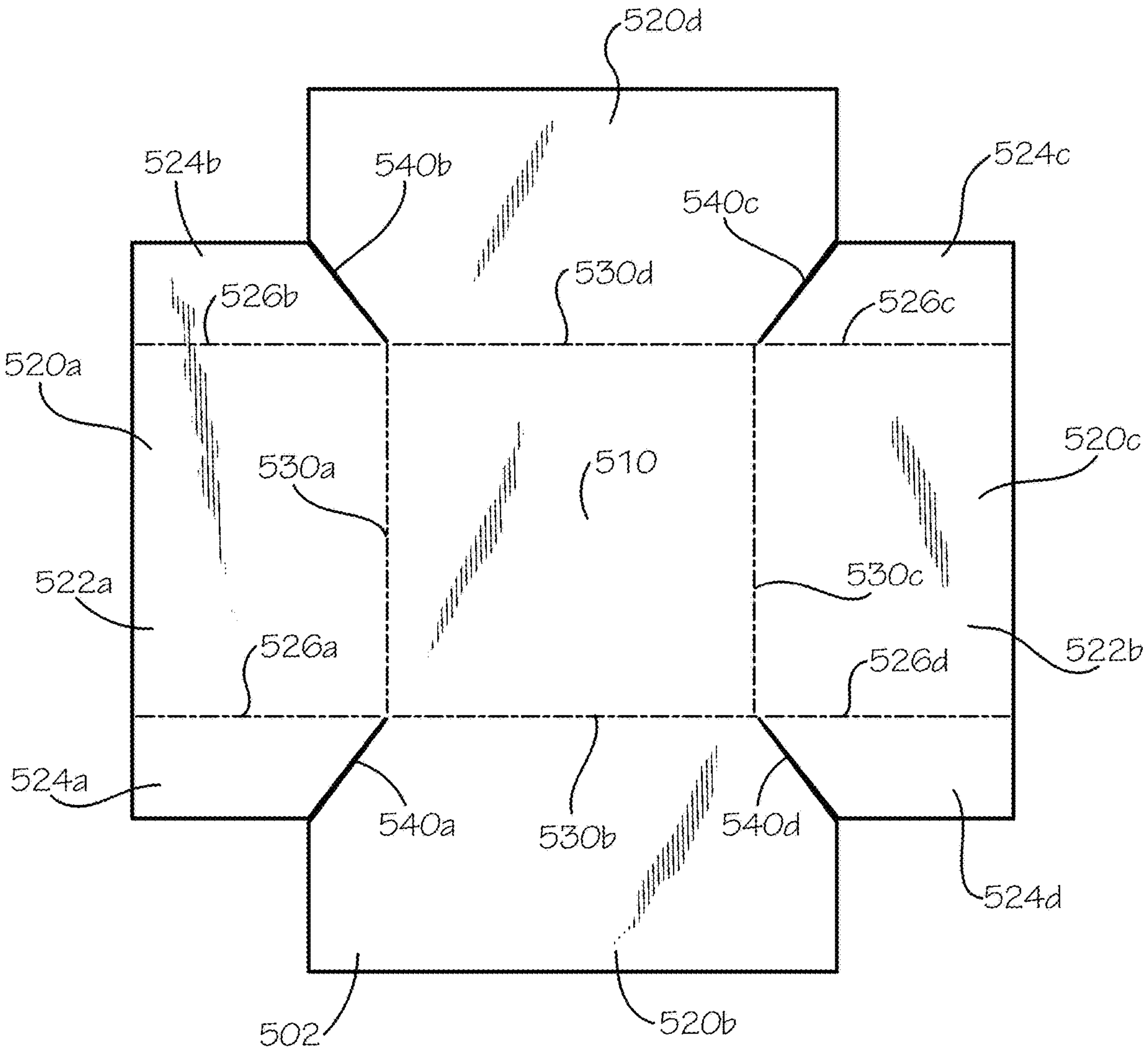
FIG. 5 shows a blank configured to be assembled into the interior piece of the insulated box.

FIG. 5 shows the interior piece 500 of the insulated box 2400 in an unassembled configuration. The interior piece 500 can comprise a bottom panel 510, side panels 520*a,b, c,d*, and fold lines 530*a,b,c,d* joining the bottom panel 510 to the side panels 520*a,b,c,d*. An interior surface 502 faces out of the page in FIG. 5. Alternating side panels—for example, a first and a third side panel 520*a,c*—can comprise a middle tab 522*a,b* and a side tab 524*a,b,c,d*. The middle tabs 522*a,b* can be joined to the side tabs 524*a,b,c,d* by fold lines 526*a,b,c,d*. A second and a fourth side panel 520*b,d* can lack fold lines. The interior piece 500 can be formed from a single flat piece with side panel cuts 540*a,b,c,d* separating the side panels 520*a,b,c,d* from each other. Thus, a blank of the interior piece 500 can be configured such that each side panel 520*a,b,c,d* is not connected to any other side panel 520*a,b,c,d*, except only indirectly through the bottom panel 510. The side panel cuts 540*a,b,c,d* can form angles with the fold lines 526*a,b,c,d*, the angles being approximately 45 degrees.

Figure 6:
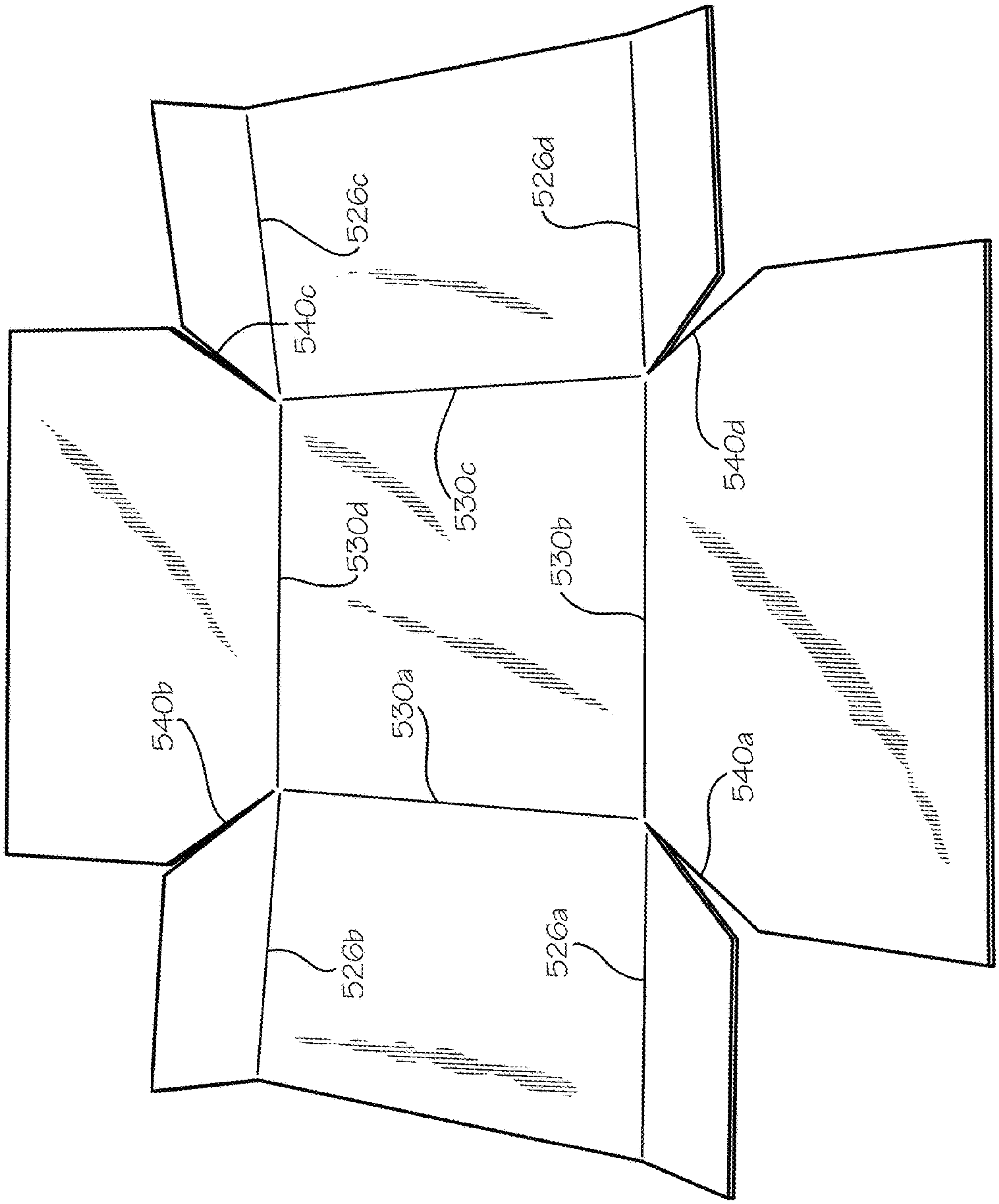
FIG. 6 is a perspective view of the blank of FIG. 5 with flaps of the blank slightly folded up.

FIG. 6 is a perspective view of the interior piece 500 with the fold lines 530*a,b,c,d*; 526*a,b,c,d* in a slightly bent configuration.

Figure 7:
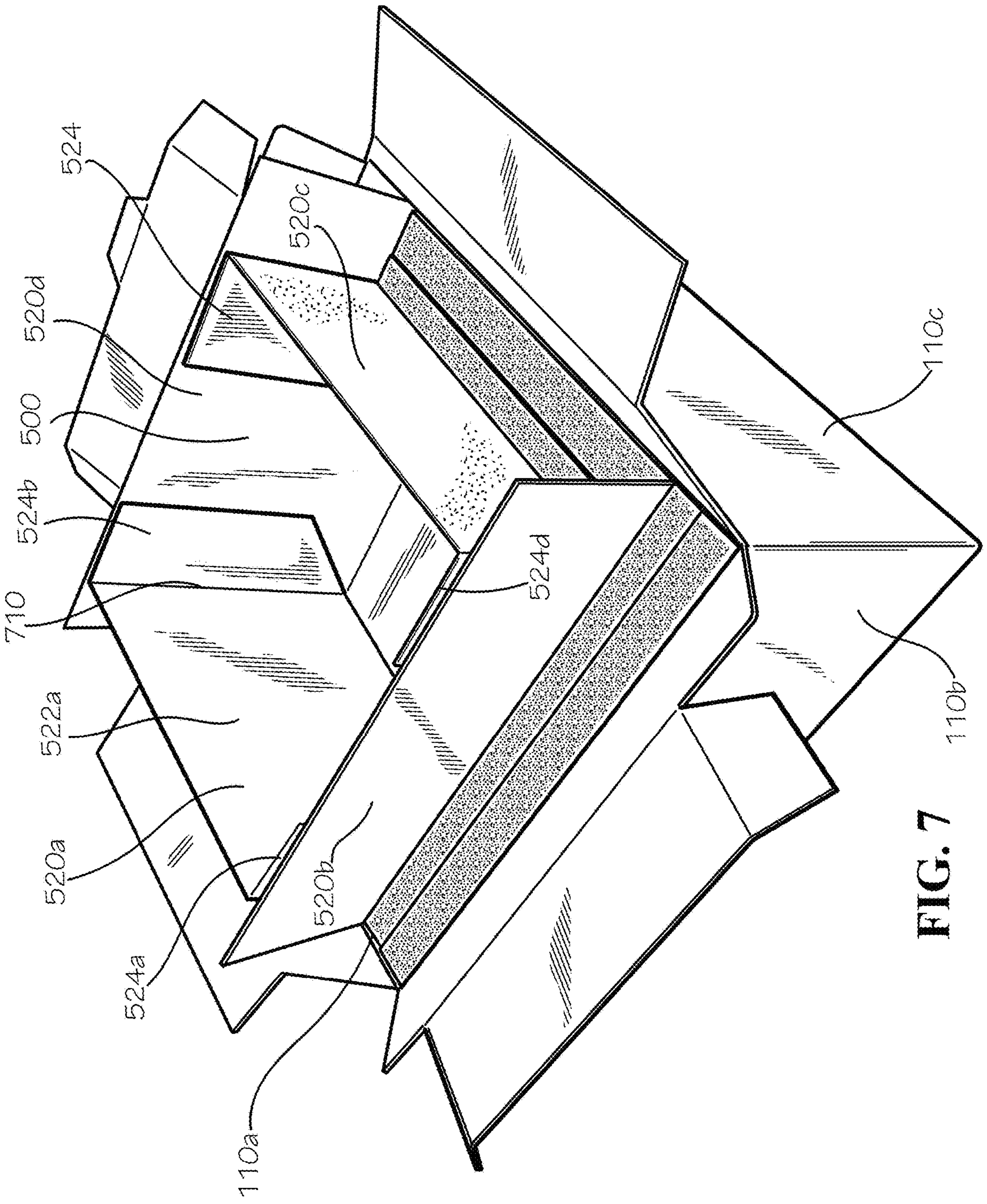
FIG. 7 is a perspective view of the interior piece positioned into the exterior piece with the insulator pads of FIG. 4 positioned therebetween.

FIG. 7 is a perspective view of the interior piece 500 partially inside the partially assembled box of FIG. 4. The middle tab 522*a* of the first side panel 520*a* of the interior piece 500 can be configured to proximately face the first middle portion 110*a* of the exterior piece 100. Likewise, the second, third, and fourth side panels 520*b,c,d* of the interior piece 500 can face the corresponding middle portions 110*b, c,d* of the exterior piece 100. Alternating side panels—for example, the second and fourth side panels 520*b,d*—can be configured to extend completely between the second and fourth middle portions 110*b,d* of the exterior piece 100. The side tabs 524*a,b,c,d* of the side panels 520*a,c* can be configured to fold inwards toward a cavity 710 in the insulated box 2400.

Figure 8:
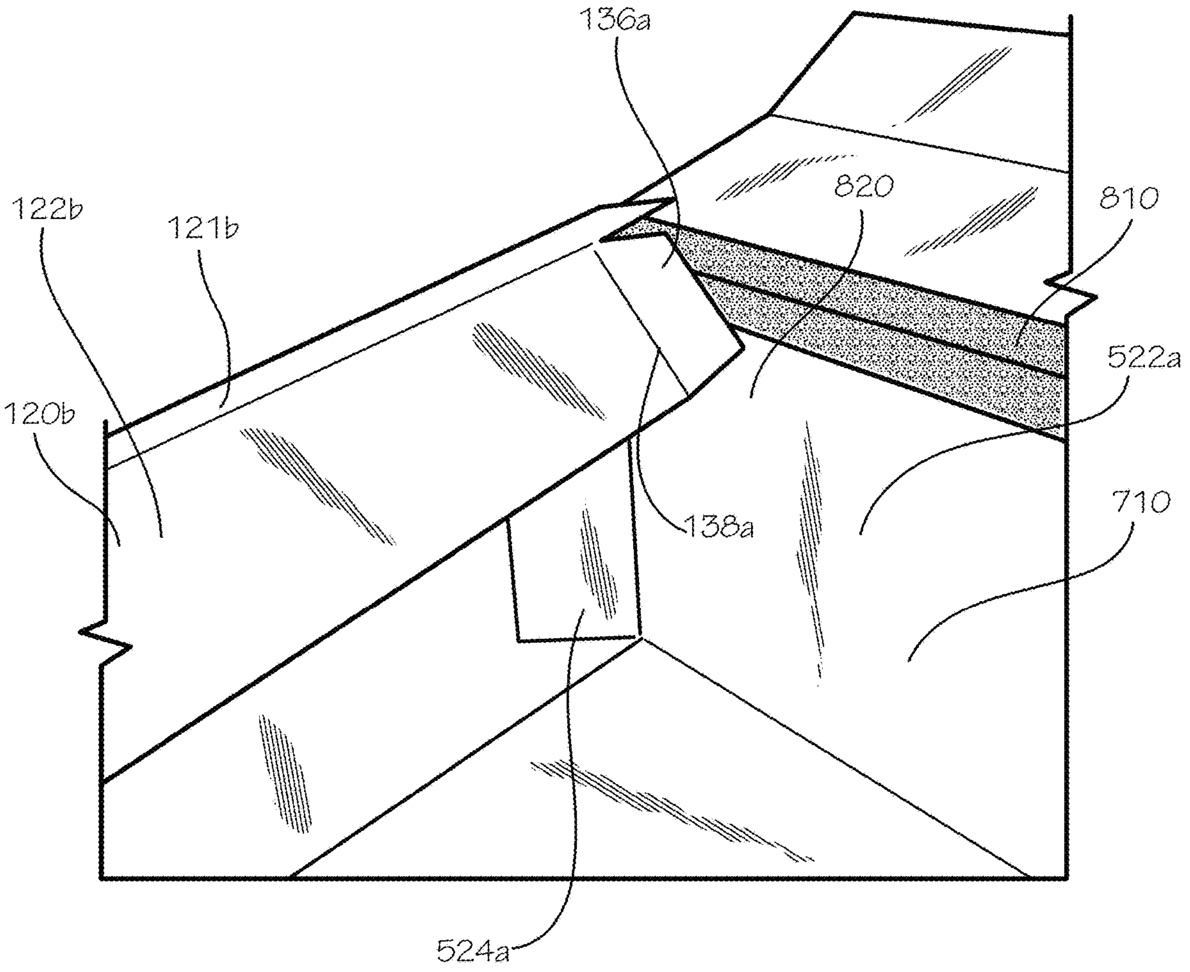
FIG. 8 is a perspective view of a top interior corner of the interior piece, with an upper portion of the exterior piece folded over to overlap a top edge of the interior piece.

FIG. 8 is a perspective view of the partially assembled insulated box 2400, showing a close-up of one of the exterior piece's 100 upper portions 120*b* (of the exterior piece 100) comprising an end segment 122*b* comprising a side tab 136*a*. The connecting segment can be configured to fold down toward the cavity 710 and cover a top edge 810 of the insulating pads 310. In other aspects (not shown) in accordance with the present disclosure, the insulator pads can be omitted, in which case the insulating properties of air left behind in a space or gap left between the interior piece 500 and the exterior piece 100 can insulate the insulated box 2400. In yet other aspects, at least a portion of the upper portion 120*a,b,c,d* of the exterior piece 100—not necessarily the connecting segment 121*a,c*—can cover at least some portion of the space. In other words, "covering" can comprise "partially covering."

The end segment 122*b* can be configured to overlap or cover a top interior portion 820 of the assembled interior piece 500. In some aspects, only a portion of the top interior portion 820 may be covered by a portion of the upper portion 120*a,b,c,d* of the exterior piece 100. The side tab 136*a* can overlap the side panel adjoining the side panel overlapped by the end segment 122*b*, which in this aspect can be side panel 520*a*.

Figure 9:
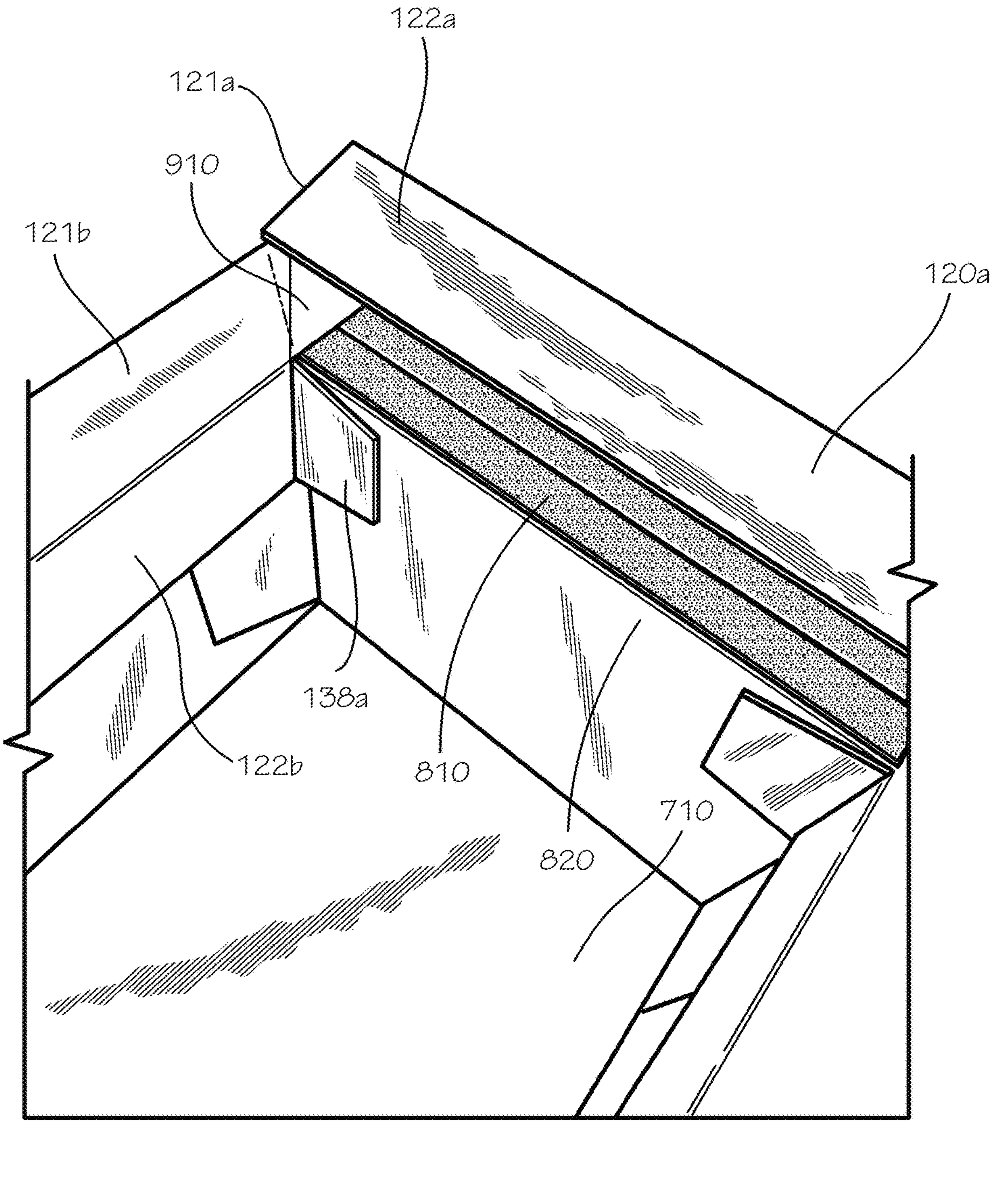
FIG. 9 is a perspective view of the partially assembled insulated box, with another upper portion of the exterior piece in the process of being folded over to overlap the top edge of the interior piece.

FIG. 9 is a perspective view of the partially assembled insulated box 2400, showing the next step in assembly after FIG. 8. The upper portion 120*a* can be configured to fold down toward the cavity 710. The connecting segment 121*a* can overlap a corner 910 of the adjoining connecting segment. The end segment 122*a* can overlap the top interior portion 820 of the interior piece 500 and further overlap the side tab 136*a* of the exterior piece 100. The end segments 122*a* can be affixed in place by adhesives known in the art or by friction without adhesive.

Figure 10:
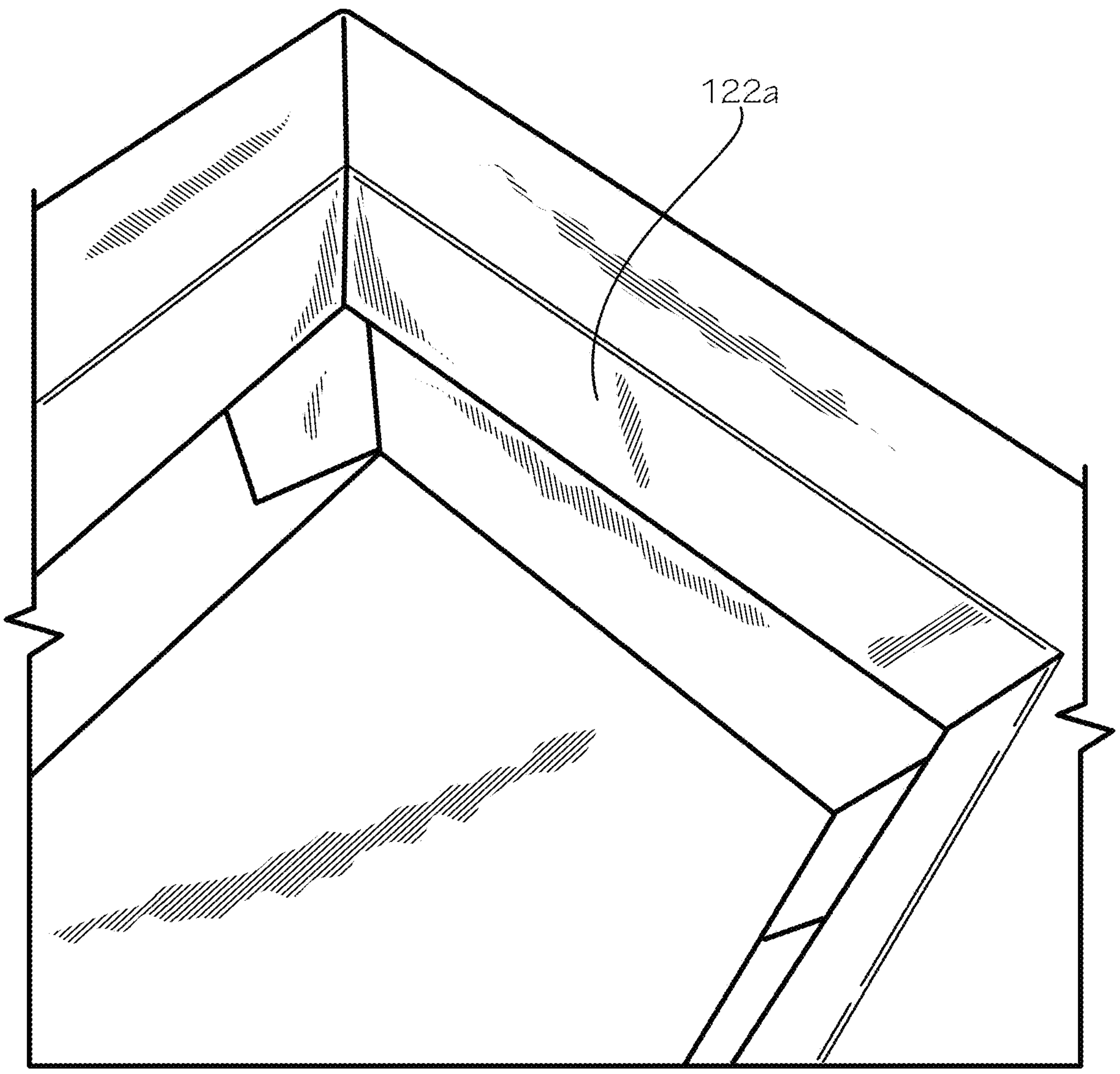
FIG. 10 is a perspective view of the insulated box after another upper portion of the exterior piece has been folded over to overlap the top edge of the interior piece.

FIG. 10 shows the insulated box 2400 after the step shown in FIG. 9 has been completed. The end segment 122*a* overlaps side panel 520*a* and side tab 136*a* of the exterior piece 100.

Figure 11:
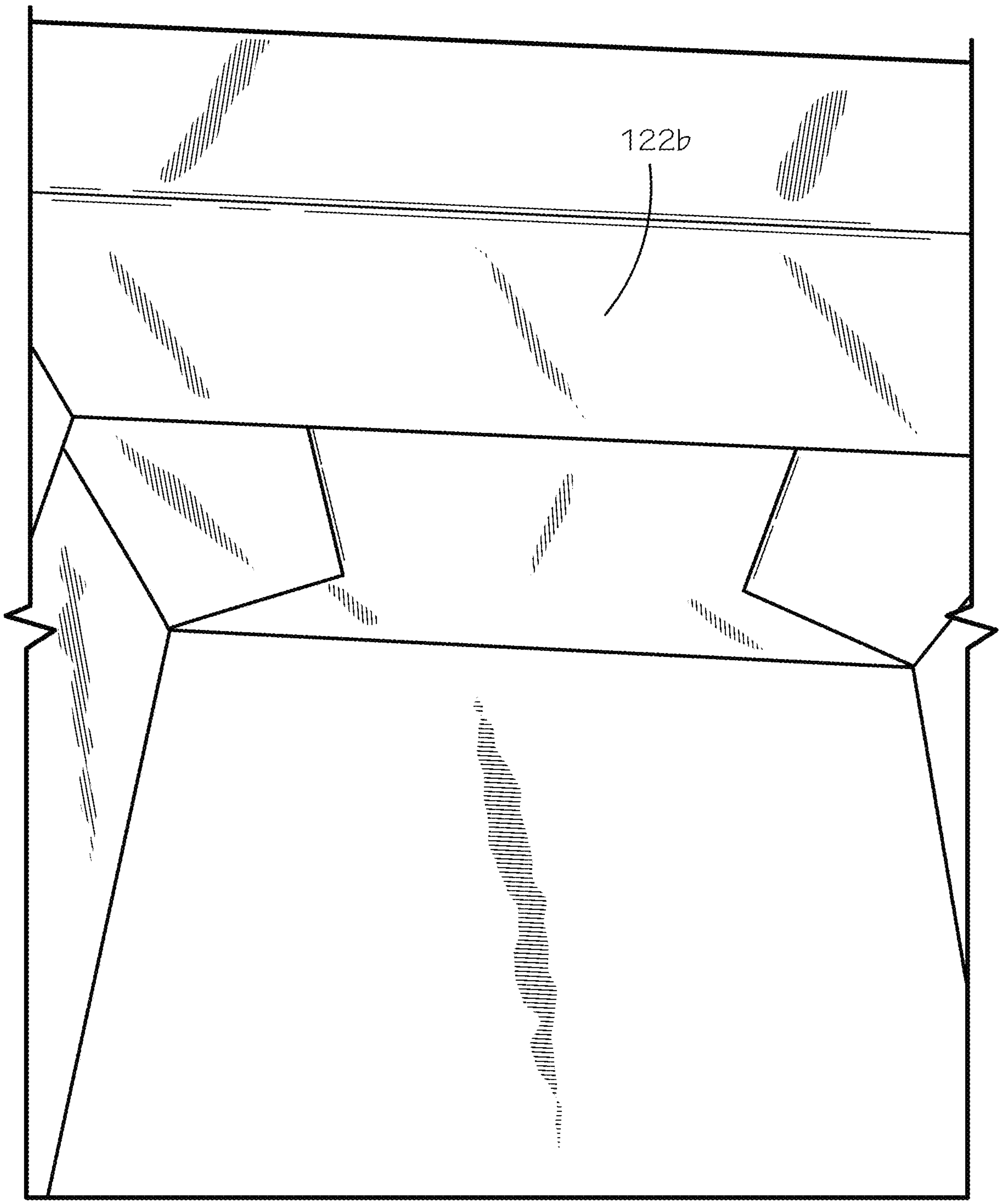
FIG. 11 is a perspective view of an interior of the insulated box with the upper portions of the exterior piece folded over and overlapping side panels of the interior piece.

FIG. 11 shows another view of the insulated box 2400, particularly a close-up of end segment 122*b*.

Figure 12:
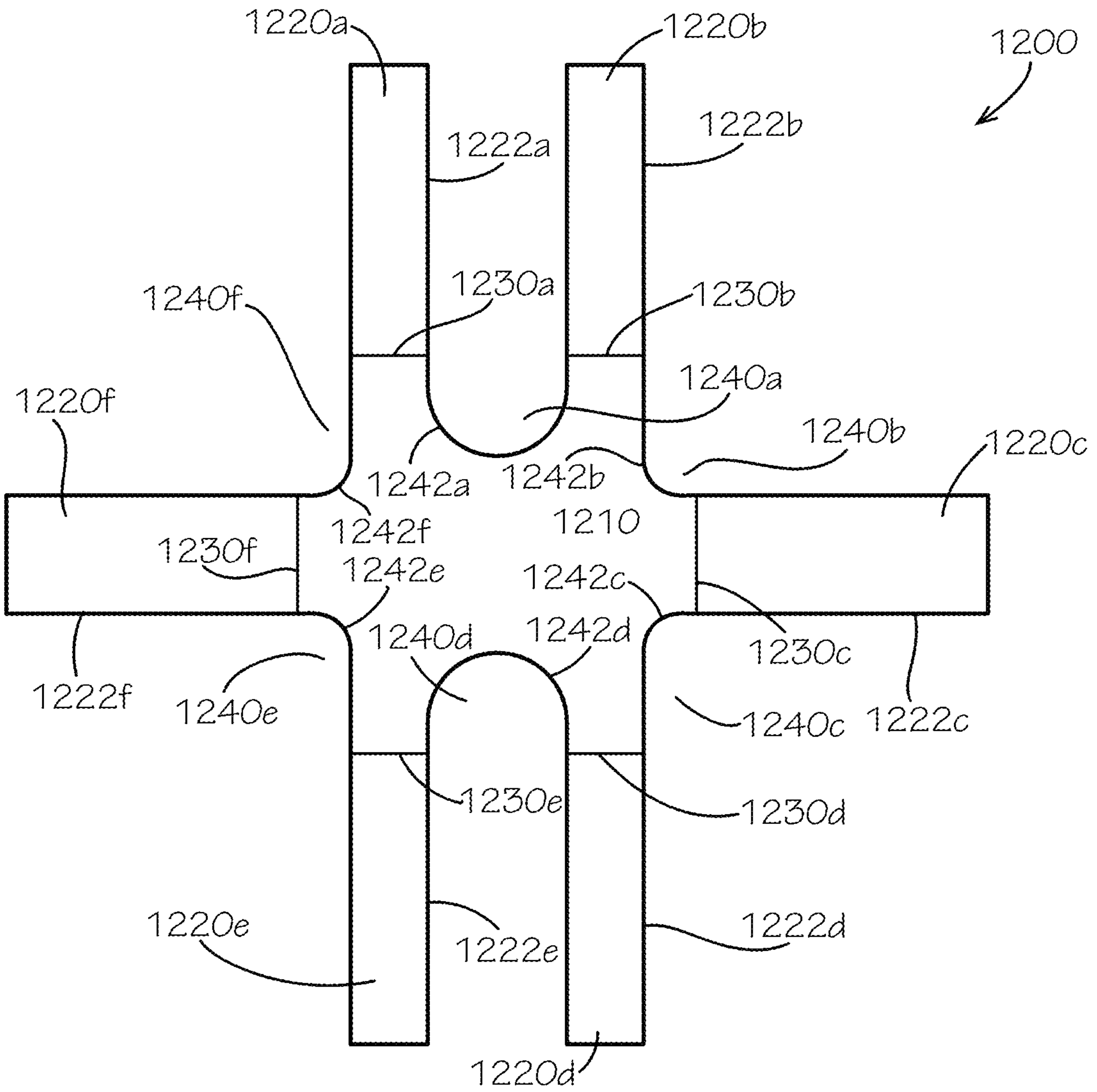
FIG. 12 shows a blank configured to be assembled into a box insert with vertical rails in accordance with another aspect of the present disclosure.

FIG. 12 is a top view of a box insert 1200 with vertical rails 1220 in a flat configuration. The box insert 1200 can comprise a center segment 1210 and vertical rails 1220*a,b, c,d, e,f* joined thereto by fold lines 1230*a,b,c,d,e,f*. The center segment 1210 can comprise cutouts 1240*a,b,c,d,e,f*. An edge 1242*a,b,c,d,e,f* of each cutout 1240*a,b,c,d,e,f* can be contiguous with an edge 1222*a,b,c,d,e,f* of each vertical rail 1220*a,b,c,d,e,f*, respectively. The edges 1242*a,b,c,d, e,f* of the cutouts 1240*a,b,c,d, e,f* can be curvilinear, rectilinear, or some other shape. The edges 1222*a,b,c,d,e,f* of the vertical rails 1220*a,b,c,d,e,f* can be curvilinear or rectilinear or some other shape.

Figure 13:
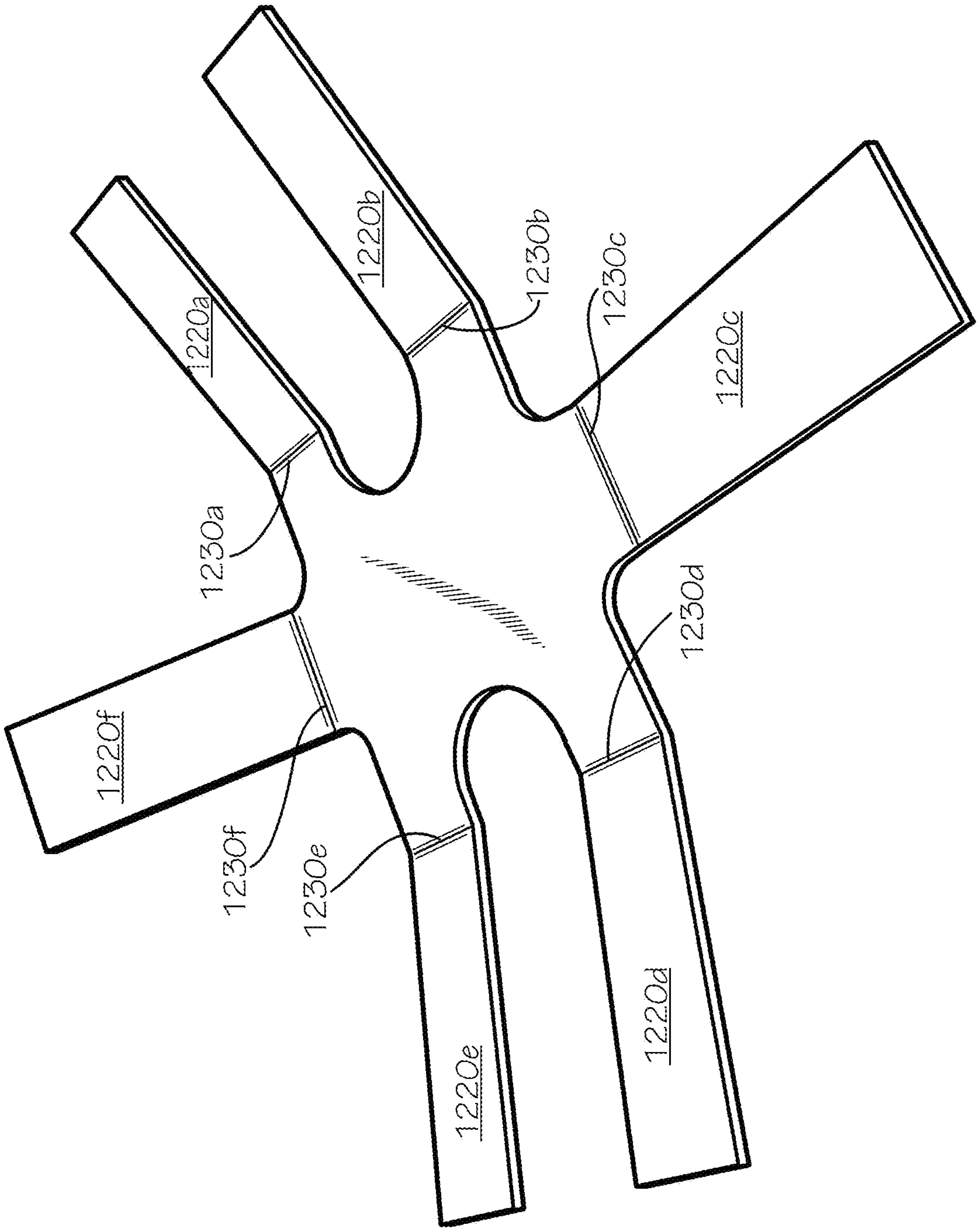
FIG. 13 is a perspective view of the blank of FIG. 12 with rails folded slightly upwards.

FIG. 13 is a perspective view of the box insert 1200. The vertical rails 1220*a,b,c,d,e,f* of the box insert 1200 can be configured to bend upward along the fold lines 1230*a,b,c, d,e,f*. As shown in the current aspect, the fold lines 1230*a, b,c,d,e,f* between the vertical rails 1220*a,b,c,d,e,f* and the center segment 1210 can coincide with the fold lines 530*a, b,c,d* between the bottom panel 510 and the side panels 520*a,b,c,d* of the interior piece 500.

Figure 14:
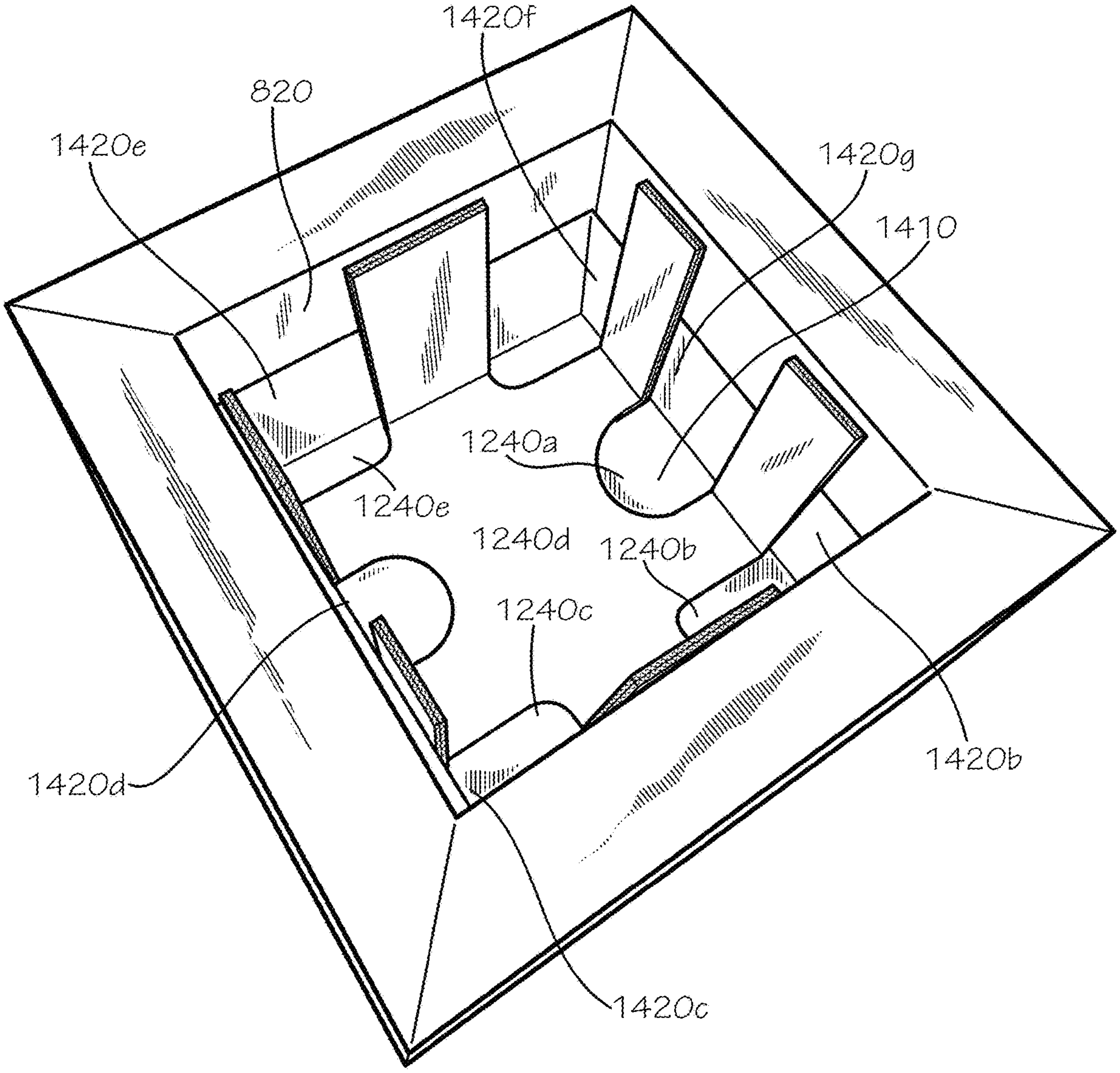
FIG. 14 is a perspective view of the insert with vertical rails inside the insulated box.

FIG. 14 is a perspective view of the box insert 1200 inside the insulated box 2400. The cutouts 1240*a,b,c,d,e,f* can be configured to expose regions of a bottom 1410 of the cavity 710. The box insert 1200 can be configured to allow air to flow to and from the cutouts 1240*a,b,c,d,e,f* and spaces 1420*a,b,c,d,e,f* between the vertical rails. The vertical rails 1220*a,b,c,d,e,f* can be configured to extend to the top interior portion 820.

Figure 15:
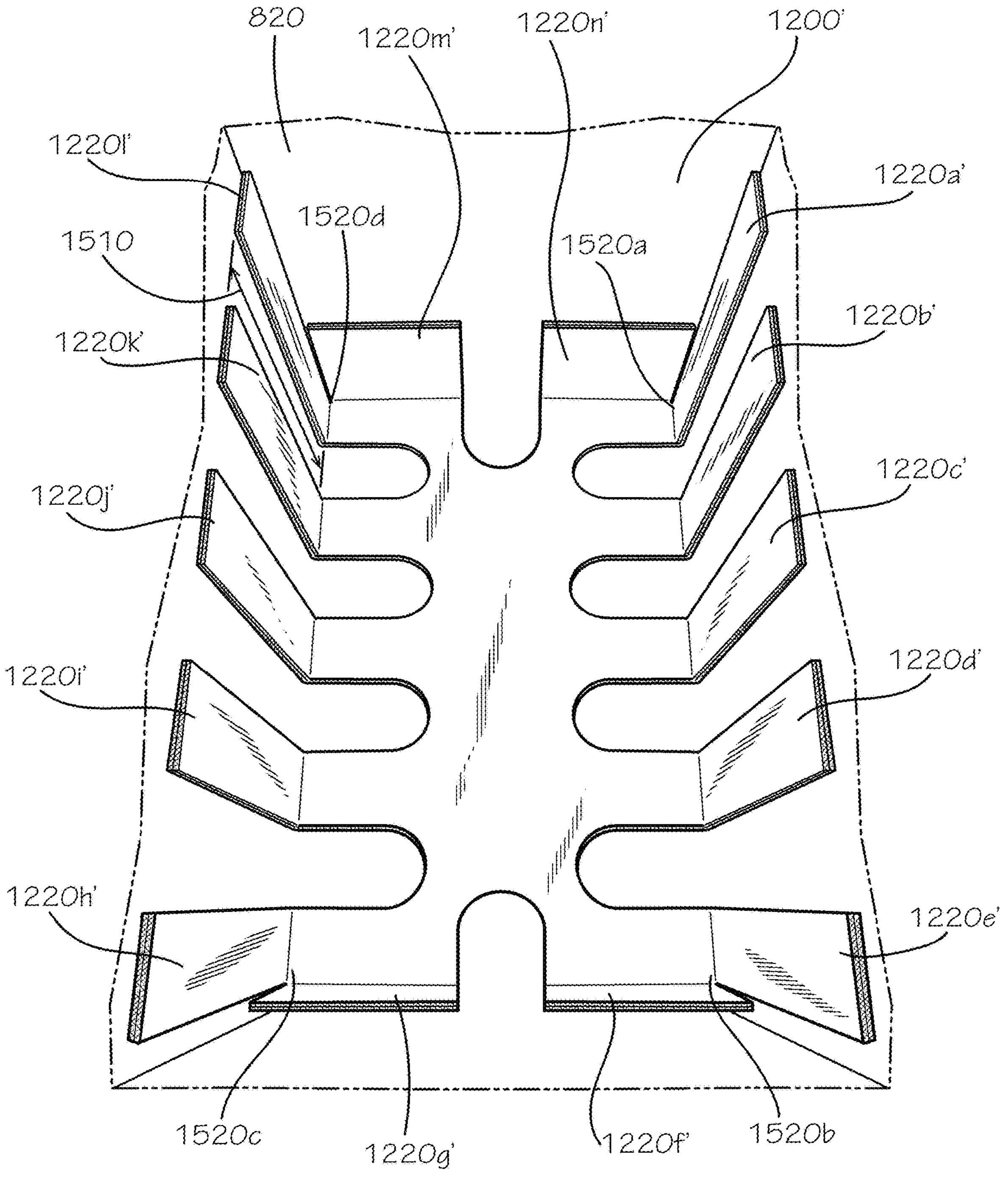
FIG. 15 is a perspective view of the insert with vertical rails in accordance with another aspect of the present disclosure.

FIG. 15 is a perspective view of the box insert 1200' in another exemplary aspect. In the current aspect, the vertical rails 1220*a*',b', c', d',e',f', g',h',i',j',k',l',m',n' can be configured to rise to a height 1510 below the top interior portion 820. The vertical rails 1220*a*',e',f',g',h',l',m',n' can also be configured to adjoin each other at bottom corners 1520*a,b,c,d*—without a space 1420 between them.

Figure 16:
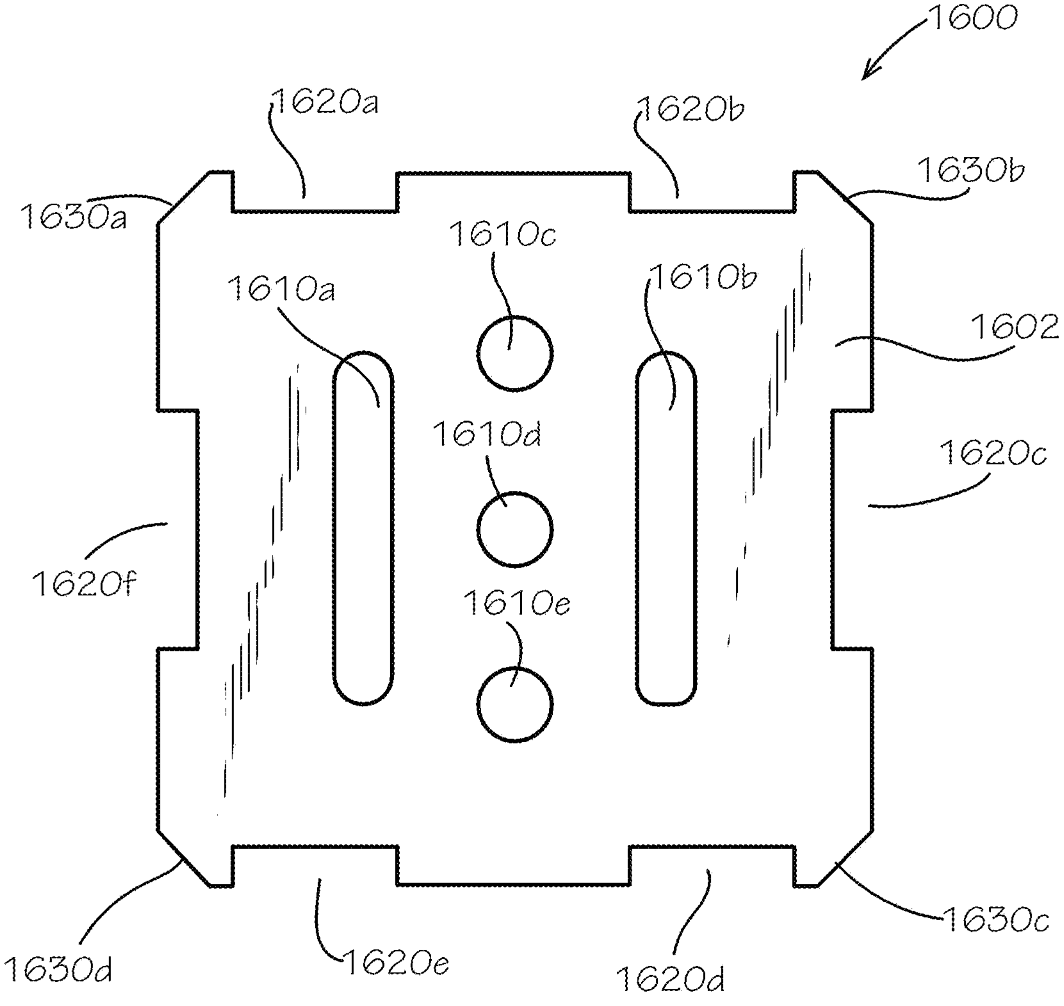
FIG. 16 is a top view of a register configured to slide up and down along the vertical rails of the insert of FIG. 12.

FIG. 16 is a top view of a register 1600. The register 1600 can comprise a face segment 1602. The face segment 1602 can comprise holes 1610*a,b,c,d*; side cutouts 1620*a,b,c,d,e, f*; and corner cutouts 1630*a,b,c,d*. The register can be cut from a single flat piece.

Figure 17:
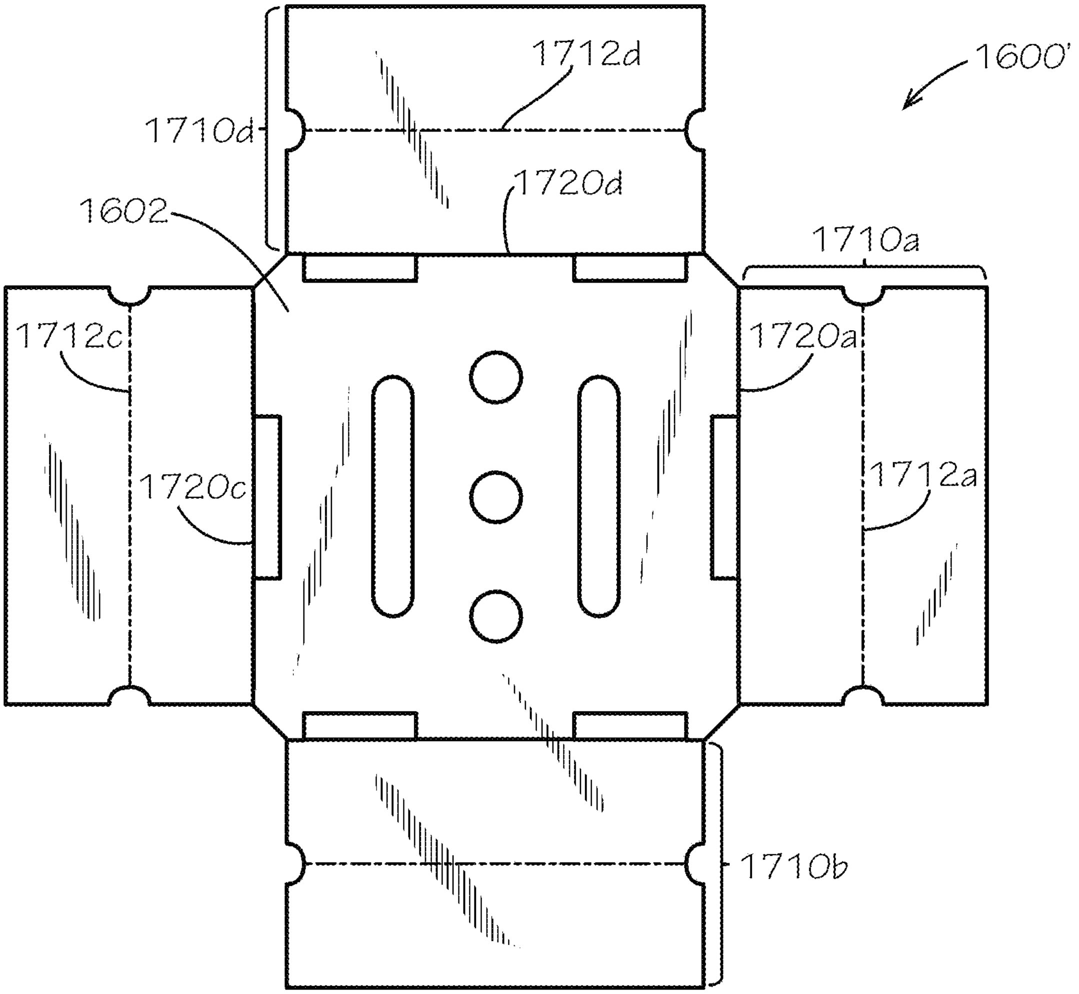
FIG. 17 is a top view of a register configured to slide up and down along the vertical rails of the insert of FIG. 12 in accordance with another aspect of the present disclosure.

FIG. 17 is a top view of a register 1700' in another exemplary aspect. The register 1600' can further comprise side segments 1700*a,b,c,d* joined to the face segment 1602 by fold lines 1720*a,b,c,d*. The side segments 1700*a,b,c,d* can comprise fold lines 1712*a,b,c,d* configured to be parallel to the corresponding fold lines 1720*a,b,c,d*.

Figure 18:
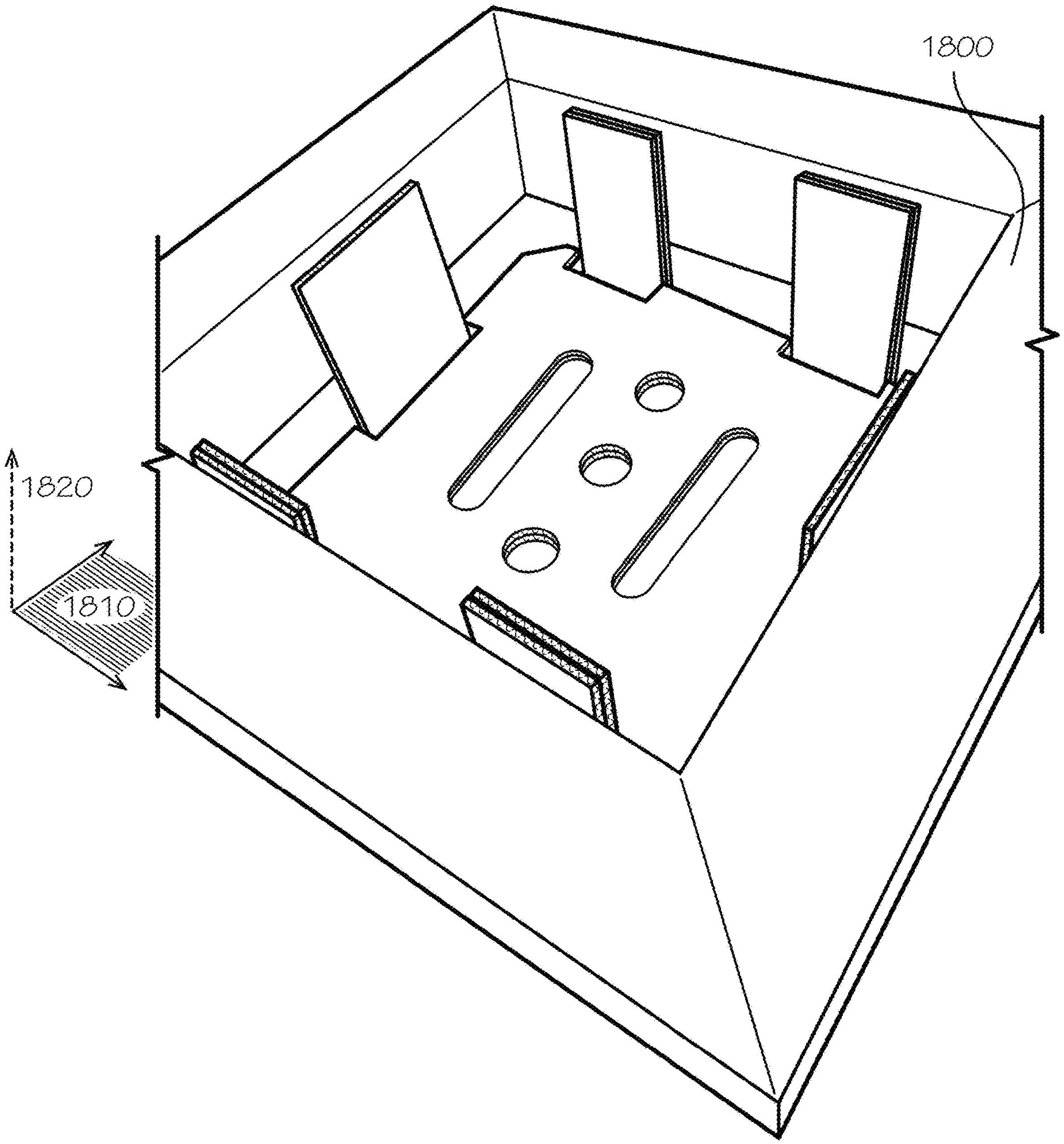
FIG. 18 is a perspective view of the register positioned in the insulated box as configured in FIG. 14.

FIG. 18 is a perspective view of the box insert 1200 receiving the register 1600. The register 1600 and the box insert 1200 can together form a registration system 1800. The registration system 1800 can be configured to allow the register 1600 to slide up and down the vertical rails 1220*a, b,c,d,e,f* along a vertical axis 1820 while the face segment 1602 is maintained in a horizontal plane 1810. The center segment 1210 can be configured to cover a bottom interior of the box 2400, and one or more of the vertical rails 1220*a,b,c,d,e,f* can be configured to cover a side interior of the box 2400. The register 1600 can be configured to slidably move along one or more of the vertical rails 1220*a,b,c,d,e,f* while maintaining a horizontal position, and the cutout 1620*a,b,c,d,e,f* of the register 1600 can be configured to surround one or more of the vertical rails 1220*a, b,c,d, e,f* of the box insert 1200.

Figure 19:
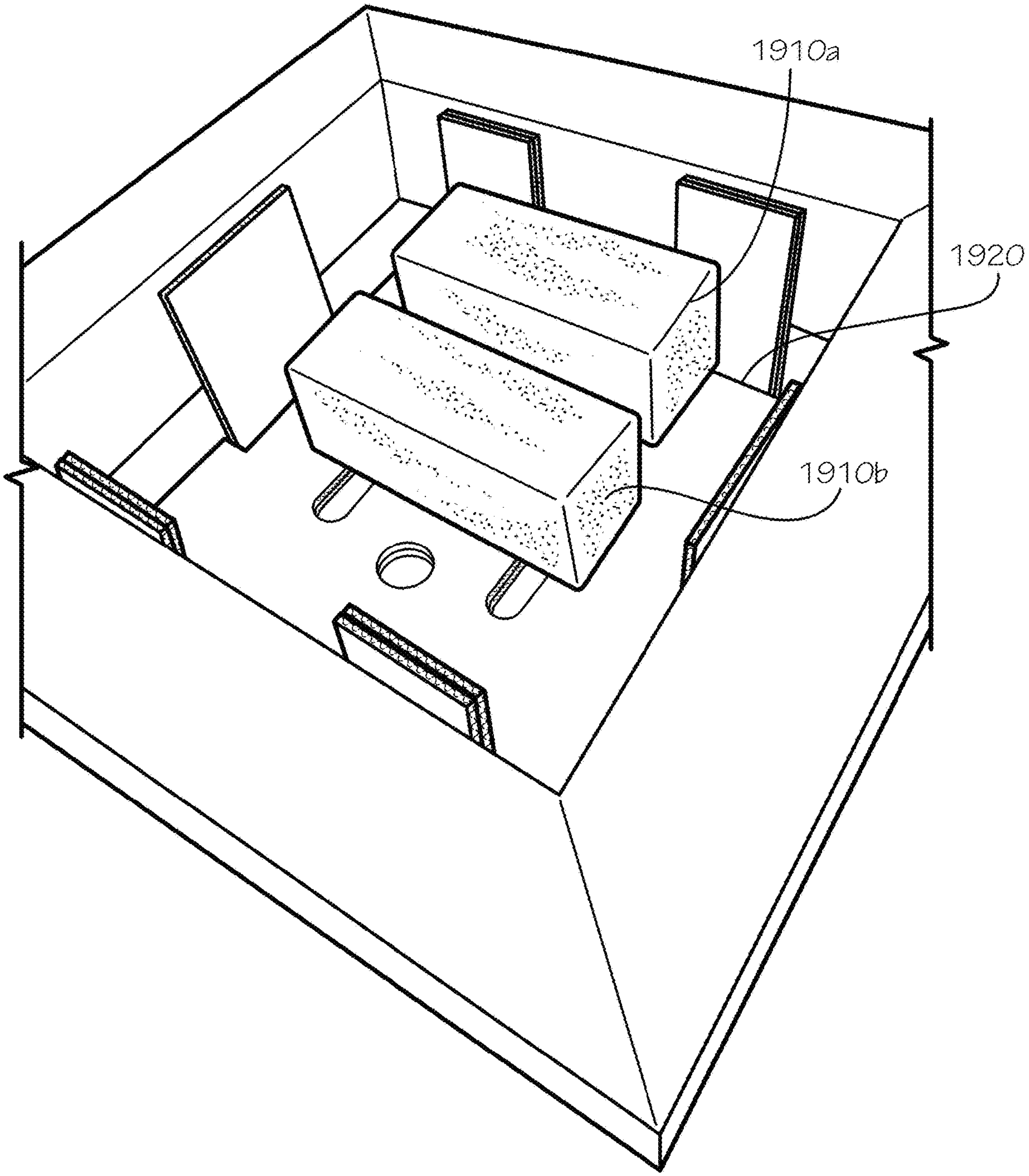
FIG. 19 is a perspective view of the insulated box of FIG. 18 comprising the register and with a representation of ice packs placed over the register.

FIG. 19 is a perspective view of the registration system 1800. The side cutouts 1620*a,b,c,d,e,f* can be configured to receive the vertical rails 1220*a,b,c,d,e,f* such that the register 1600 does not tip over when an overhead weight 1910*a,b* is placed near an edge 1920 of the face segment 1602 or when the register 1600 is not supported under a center of mass (not shown) of the register 1600 with the overhead weight 1910*a,b*.

Figure 20:
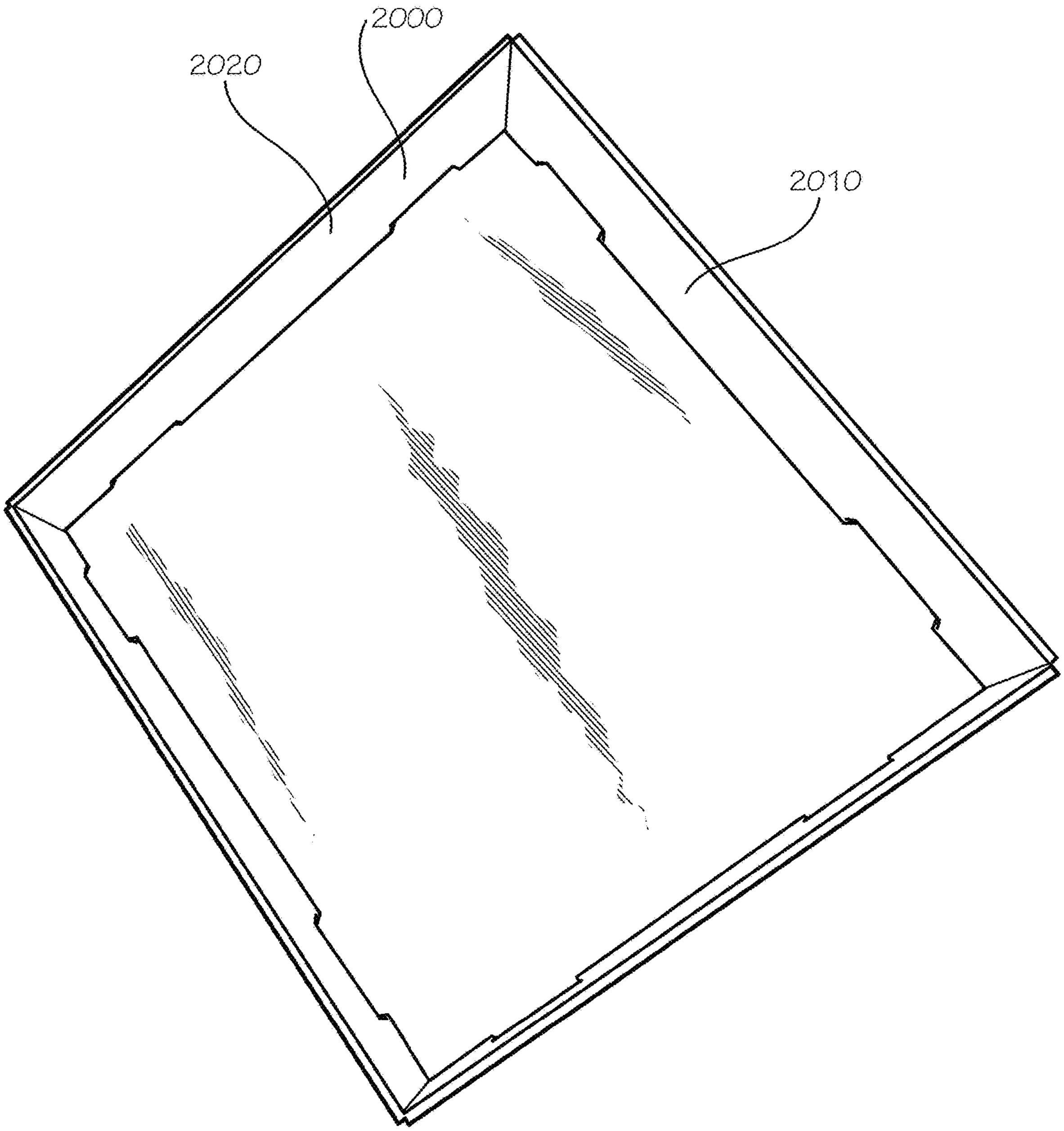
FIG. 20 is a perspective view of an assembled lid in accordance with another aspect of the present disclosure.

FIG. 20 is a perspective view of a lid 2000 for the insulated box 2400. The lid 2000 can comprise an inner piece 2010 and an outer piece 2020.

Figure 21:
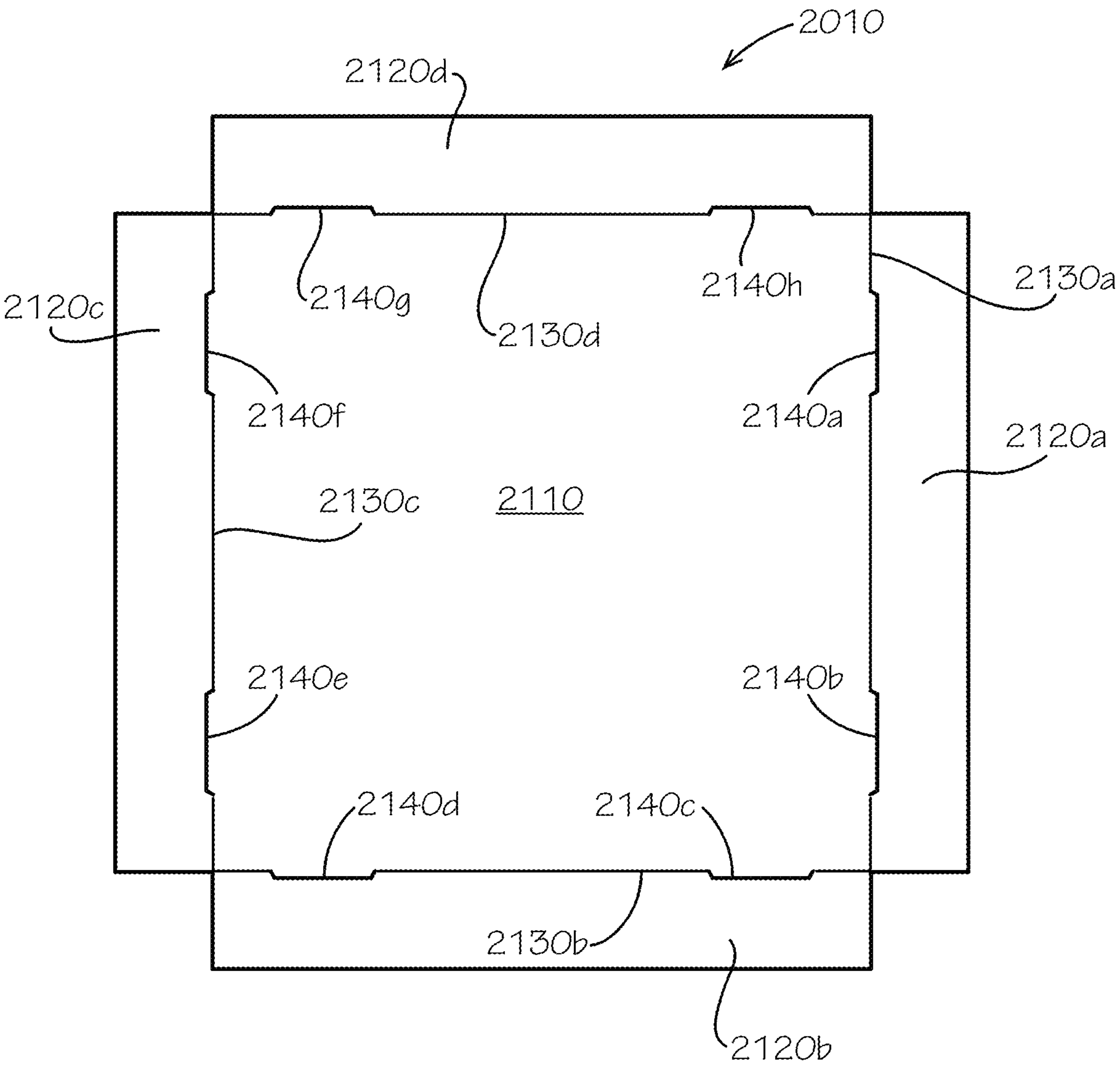
FIG. 21 shows a blank configured to be assembled into an inner piece of the lid of FIG. 19.

FIG. 21 is a top view of the inner piece 2010 of the lid 2000 in a flat, unassembled configuration. The inner piece 2010 can comprise a center segment 2110 and side segments 2120*a,b,c,d* joined to the center segment 2110 by fold lines 2130*a,b,c,d*. The fold lines 2130*a,b,c,d* can comprise tab cuts 2140*a,b,c,d,e,f,g,h*.

Figure 22:
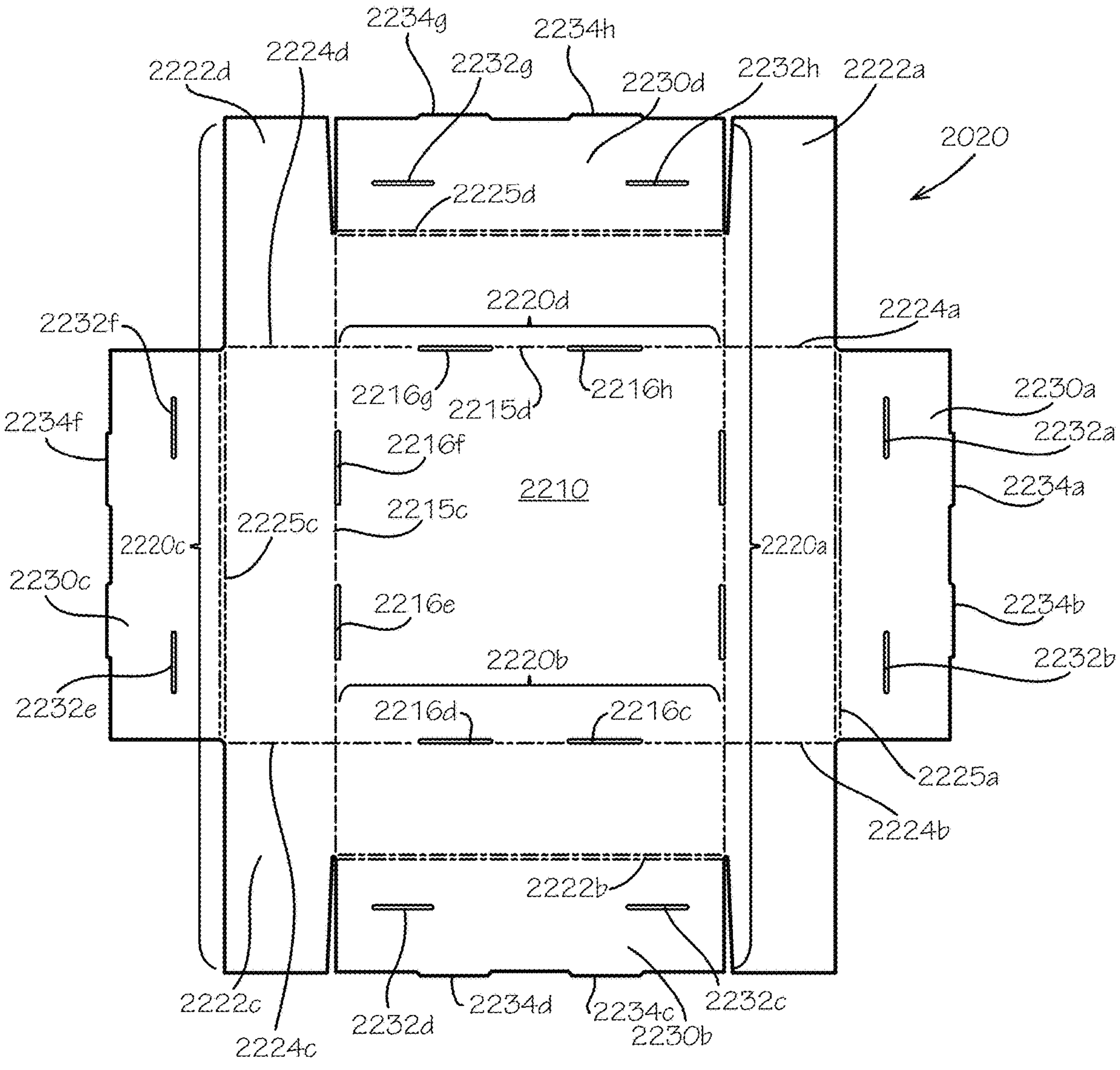
FIG. 22 shows a blank configured to be assembled into an outer piece of the lid of FIG. 19.

FIG. 22 is a top view of the outer piece 2020 of the lid 2000 in a flat, unassembled configuration. The outer piece 2020 can comprise a center segment 2210, connecting segments 2220*a,b,c,d* joined to the center segment 2210 by fold lines 2215*a,b,c,d*, and end segments 2230*a,b,c,d* joined to the connecting segments 2220*a,b,c,d* by fold lines 2225*a, b,c,d*. The fold lines 2225*a,b,c,d* can be double fold lines. Alternating segments, such as a first and a third connecting segment 2220*a,c*, can comprise side tabs 2222*a,b,c,d* joined to the connecting segments 2220*a,c* by fold lines 2224*a,b, c,d*. The fold lines 2215*a,b,c,d* joining the center segment 2210 to the connecting segments 2220*a,b,c,d* can comprise or define slots 2216*a,b,c,d,e,f,g,h*. The end segments 2230*a, b,c,d* can comprise tab slots 2232*a,b,c,d,e,f,g,h* and tabs 2234*a,b,c,d,e,f,g,h*. Any one or more of the fold lines disclosed herein can be defined by the parts joined by or at the corresponding fold line(s).

Figure 23:
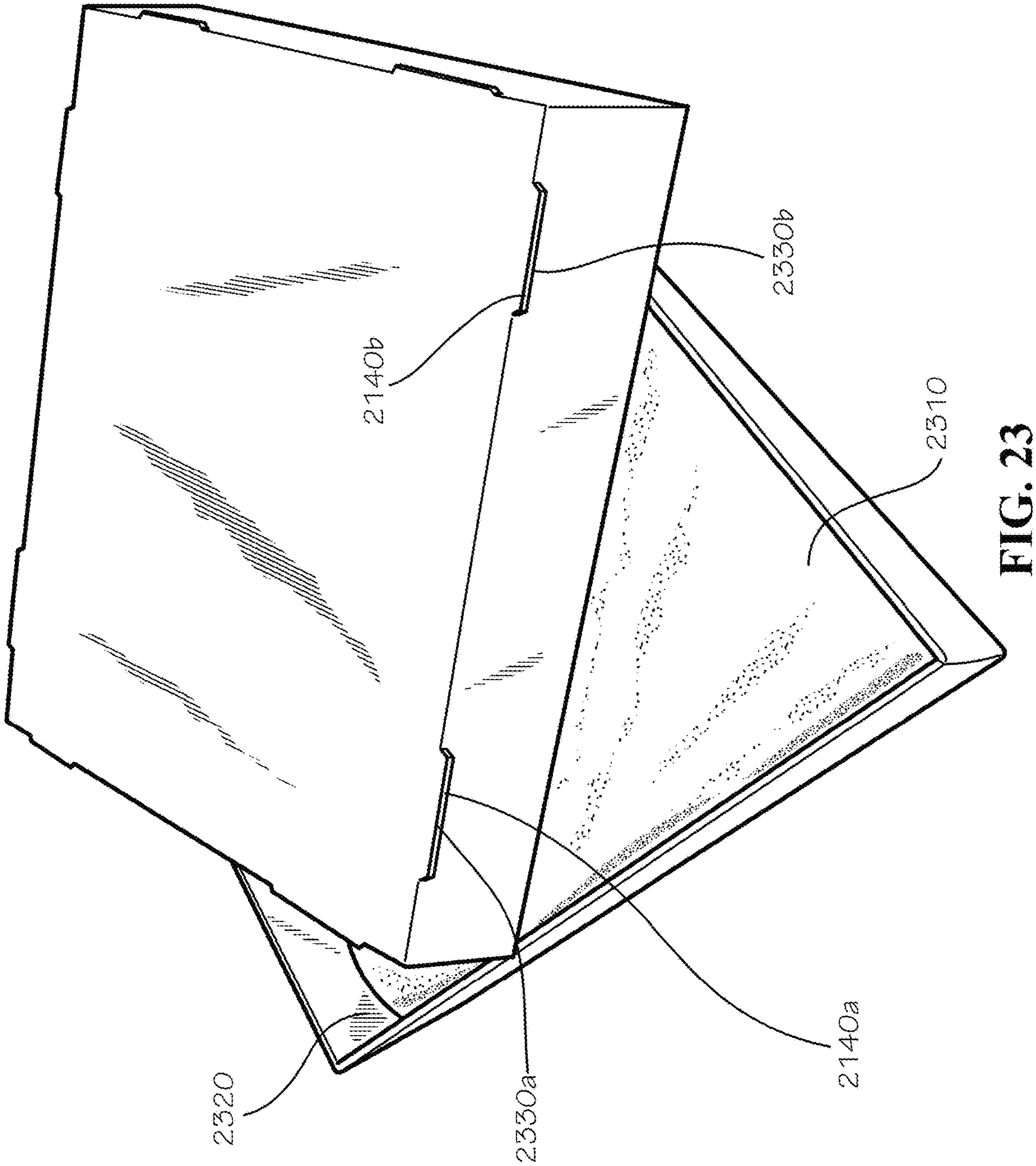
FIG. 23 is a perspective view of the lid of FIG. 19 in a partially assembled configuration.

FIG. 23 is a perspective view of a partially-assembled lid 2000. The lid 2000 can further comprise an insulator such as an insulating pad 2310 between the outer piece 2020 and the inner piece 2010. The side segments 2120*a,b,c,d* of the inner piece 2010 can fold toward a cavity 2320 of the outer piece 2020 in an assembled configuration. Folding the side segments 2120*a,b,c,d* in this way can expose the tabs 2330*a,b* (and others not shown) formed by the tab cuts 2140*a,b,c,d,e,f,g,h*. The tabs 2330*a,b* can be received by the tab slots 2232*a,b,c,d,e,f,g,h* such that the insulating pad 2310 and the inner piece 2010 are secured. The outer piece 2020 can be assembled by sandwiching the side tabs 2222*a,b,c,d* between neighboring connecting segments 2220*b,d* and end segments 2230*b,d*.

Figure 24:
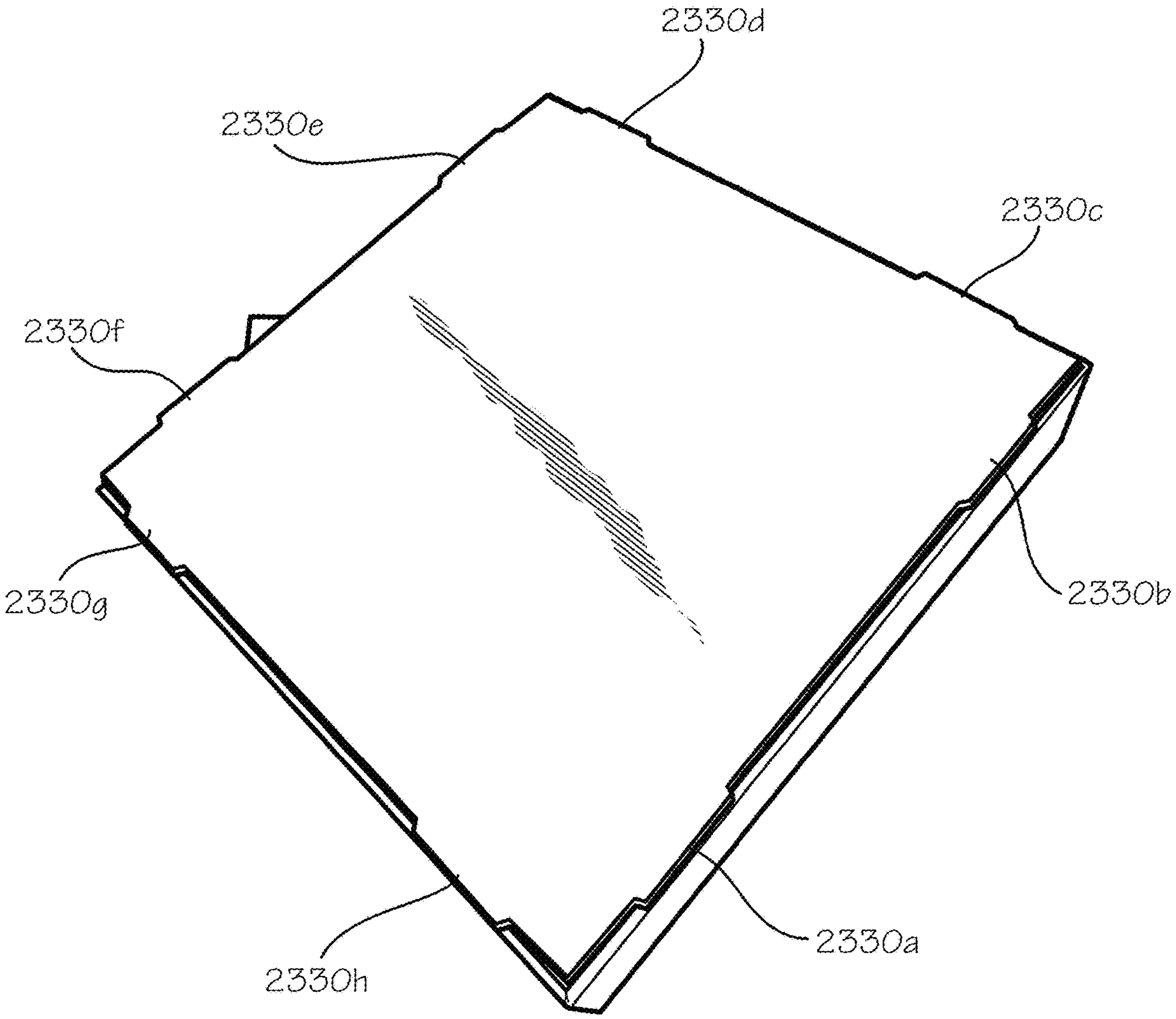
FIG. 24 is a perspective view of the lid of FIG. 19 in another partially assembled configuration prior to one remaining step of pushing the inner piece of the lid into the outer piece of the lid such that tabs of the inner piece are secured by slots of the outer piece.

FIG. 24 shows another perspective view of the inner piece 2010 with its side segments 2120*a,b,c,d* folded into the outer piece 2020, the inner piece 2010 ready to be pushed in, locking the tabs 2330*a,b,c,d,e,f* of the inner piece 2010 into the tab slots 2232*a,b,c,d,e,f,g,h* of the outer piece 2020 (shown in FIG. 22).

Figure 25:
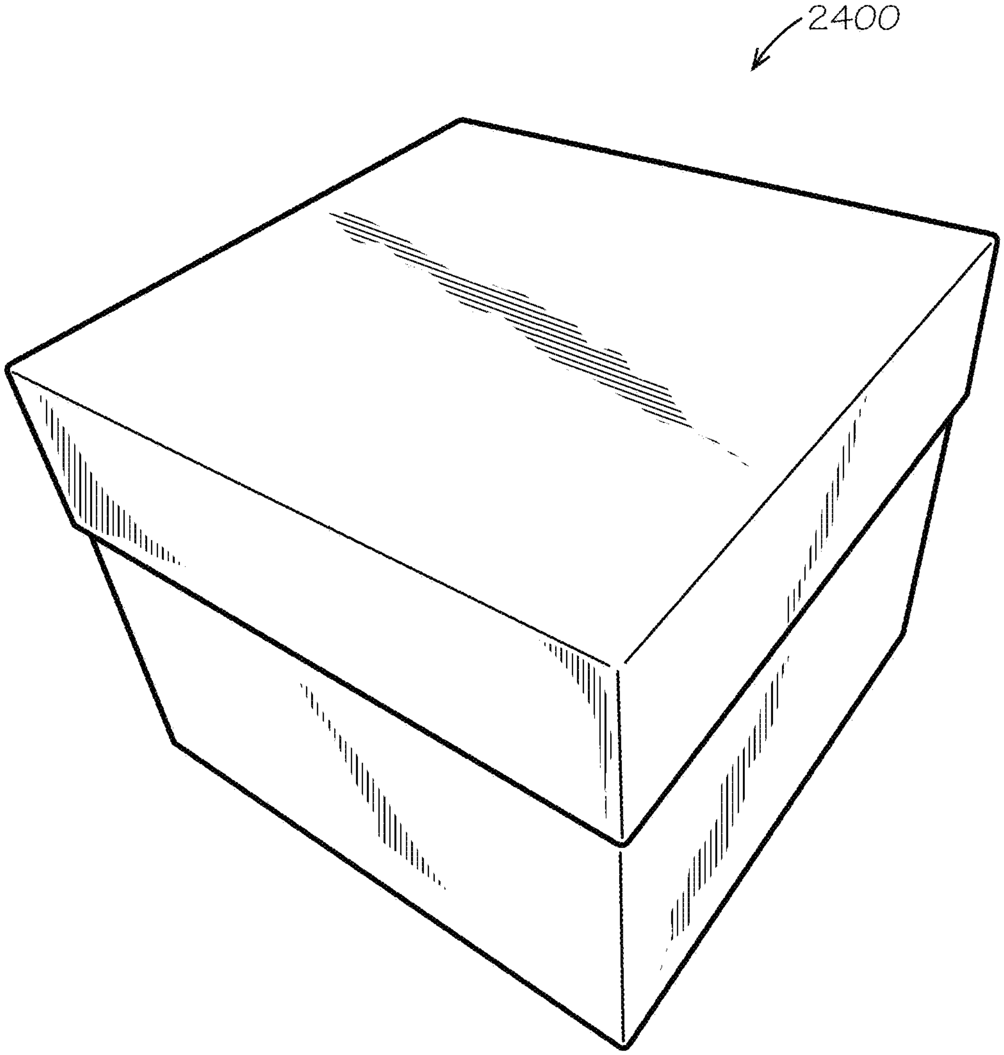
FIG. 25 is a perspective view of the insulated box covered by the lid.

FIG. 25 shows the assembled insulated box 2400 covered by the lid 2000.

The interior piece 500 and the exterior piece 100 of the insulated box 2400, the register 1600, the box insert 1200 with vertical rails 1220, and the inner piece 2010 and the outer piece 2020 of the lid 2000 can each be formed from a single piece of flat material, such as solid cardboard, corrugated cardboard, corrugated plastic, and other materials known in the art. The box insert 1200 with vertical rails 1220 can also be used with or without the register 1600 to maintain a uniform temperature and humidity level within the insulated box 2400. The spaces 1420 between the vertical rails 1220, the cutouts 1620 exposing the bottom 1410 of the cavity 710, and the holes 1610 in the register 1600 can all facilitate air flow and by diffusion and convection.

The registration system 1800 can be configured to place perishable items such as food (not shown) on one side of the register 1600 and a heat transfer element such as an ice pack (not shown) on the other. The ice pack can be place above the food to allow cooling by cold air flowing downward. Multiple registers 1600 can be used.

One should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

It should be emphasized that the above-described aspects are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described aspect(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A box assembly comprising:
an interior piece comprising a plurality of side panels;
an exterior piece positioned around the interior piece, the exterior piece comprising:
a plurality of middle portions; and
a plurality of insulator pads, each insulator pad contacting:
one of the plurality of middle portions; and
one of the plurality of side panels; and
a lid in axial alignment with the interior piece and the exterior piece, the lid comprising:
an outer piece defining an outer rim;
an inner piece inside the outer piece and defining:
an inner rim coupled to the outer rim; and
a space between the outer piece and the inner piece; and
a repulpable insulator pad within the space.

2. The box assembly of claim 1, wherein the plurality of side panels comprises a first side panel and a second side panel, and wherein the interior piece is formed from a single flat piece with a side panel cut separating the first side panel from the second side panel, wherein the first side panel is not connected to the second side panel.

3. The box assembly of claim 1, wherein a first side insulator pad of the plurality of insulated pads of the exterior piece is positioned between a first side panel of the plurality of side panels and a first middle portion of the plurality of middle portions.

4. The box assembly of claim 1, wherein a first side insulator pad of the plurality of insulator pads is longer than a second side insulator pad of the plurality of insulator pads.

5. The box assembly of claim 1, wherein the plurality of side panels comprises a first side panel and a second side panel, wherein the first side panel comprises a first side tab and a first middle tab, wherein the first middle tab is perpendicular to the second side panel, and the first side tab is parallel to the second side panel.

6. The box assembly of claim 1, wherein the plurality of side panels comprises a first side panel and a second side panel, and wherein the first side panel comprises a side tab and the second side panel comprises a middle tab.

7. The box assembly of claim 6, wherein the middle tab is joined to the side tab by fold lines.

8. The box assembly of claim 1, wherein the plurality of side panels comprises a first side panel and a second side panel, and wherein the first side panel and the second side panel are each coupled to a bottom panel of the interior piece.

9. The box assembly of claim 8, wherein the plurality of insulator pads further comprises a bottom insulator pad positioned beneath the bottom panel.

* * * * *